(12) United States Patent
Hutchison et al.

(10) Patent No.: US 7,096,709 B2
(45) Date of Patent: Aug. 29, 2006

(54) GRAPHIC ARTS DIE AND SUPPORT PLATE ASSEMBLY

(75) Inventors: Larry Hutchison, Overland Park, KS (US); Derek Smith, Shoreham By Sea (GB)

(73) Assignee: Universal Engraving, Inc., Overland Park, KS (US)

( * ) Notice: Subject to any disclaimer, the term of this patent is extended or adjusted under 35 U.S.C. 154(b) by 36 days.

(21) Appl. No.: 11/109,605

(22) Filed: Apr. 20, 2005

(65) Prior Publication Data

US 2005/0257594 A1    Nov. 24, 2005

Related U.S. Application Data

(63) Continuation-in-part of application No. 10/851,715, filed on May 21, 2004, now abandoned.

(51) Int. Cl.
*B21K 5/12* (2006.01)
*B26D 7/26* (2006.01)
*B26F 1/44* (2006.01)

(52) U.S. Cl. .............. 72/482.94; 72/481.1; 76/107.8; 83/699.11; 83/698.41; 83/698.42

(58) Field of Classification Search .............. 76/107.8; 83/343–348, 699.11, 698.41, 698.42; 72/481.8, 72/482.94

See application file for complete search history.

(56) References Cited

U.S. PATENT DOCUMENTS 509,075 A    11/1893    Fletsch et al.
694,905 A    3/1902     Yundt et al.

(Continued)

FOREIGN PATENT DOCUMENTS

AU    5853301    9/2003

(Continued)

OTHER PUBLICATIONS

Bobst SA 1996 Brochure titled Autoplaten SP 102-BMA SP 126-BMA; Printed in Switzerland No. 9007-2 (copied in color and attached).

(Continued)

*Primary Examiner*—David B Jones
(74) *Attorney, Agent, or Firm*—Hovey Williams LLP

(57) ABSTRACT

A graphic arts die and support plate assembly is provided that is adapted to be mounted as a unit on the chase of a flat bed or rotary graphic arts press. The assembly includes a plurality of spaced individual dies fixedly mounted in predetermined relative relationship on a support plate member of the unit. Alignment holes in each die that register with orifices in the support plate member are adapted to receive temporary alignment pins thereby assuring correct positioning of the dies with respect to one another on the support plate member until the dies are affixed to the support plate member. Makeready and die lock-up time of the press is significantly decreased because all dies of the assembly may be preregistered with a design artwork before mounting of the die and support assembly on the press. A series of graphic arts die units are also provided that are adapted to be mounted as an assembly encompassing more than 180° of the circumference of a rotary press chase. The graphic arts die units have die support plate members that may be aligned with indicia on the press chase, and that have notch structure receiving a tool for facilitating alignment and spacing between adjacent die support plate members. Cutouts in the die support plate members permit manual selective shifting of a die relative to the die support plate member therefor using a tool received in a cutout and engageable with the die.

52 Claims, 11 Drawing Sheets

U.S. PATENT DOCUMENTS

| | | |
|---|---|---|
| 720,387 A | 2/1903 | Wensel |
| 724,116 A | 3/1903 | Maley |
| 747,845 A | 12/1903 | Beach |
| 810,067 A | 1/1906 | Maley |
| 873,303 A | 12/1907 | Dohrmann |
| 1,550,766 A | 8/1925 | Warnock |
| 1,729,412 A | 9/1929 | Andrews |
| 2,283,587 A | 5/1942 | Steinbach |
| 2,736,257 A | 2/1956 | Stephenson |
| 2,756,675 A | 7/1956 | Monaco |
| 3,188,900 A * | 6/1965 | Mauro ................. 76/107.1 |
| 3,296,958 A | 1/1967 | Liepelt |
| 3,301,174 A | 1/1967 | Sciame |
| 3,670,647 A | 6/1972 | Funk et al. |
| 3,721,189 A | 3/1973 | Bray |
| 3,820,460 A | 6/1974 | McElreath |
| 3,824,927 A | 7/1974 | Pugh et al. |
| 3,837,959 A | 9/1974 | Bishop |
| 3,882,775 A | 5/1975 | Lytle et al. |
| 3,885,497 A | 5/1975 | Jenkins |
| 3,885,498 A | 5/1975 | Jenkins |
| 4,116,594 A | 9/1978 | Leanna et al. |
| 4,580,492 A | 4/1986 | Troyan et al. |
| 5,069,122 A | 12/1991 | Kaufmann et al. |
| 5,515,749 A * | 5/1996 | Sandford ................. 76/107.8 |
| 5,520,080 A * | 5/1996 | Sandford ................. 83/698.51 |
| 6,062,134 A | 5/2000 | Eitel et al. |
| 6,213,676 B1 | 4/2001 | Rebaud |
| 6,658,978 B1 * | 12/2003 | Johnson ................. 76/107.8 |
| 6,912,941 B1 * | 7/2005 | Johnson ................. 83/699.11 |

FOREIGN PATENT DOCUMENTS

| | | |
|---|---|---|
| DE | 4125996 | 3/1993 |
| EP | 916489 | 5/1999 |
| EP | 1332049 | 9/2003 |
| FR | 1149797 | 12/1957 |
| GB | 2346589 | 8/2000 |
| GB | 2372963 | 9/2002 |
| GB | 2386585 | 9/2003 |
| GB | 2403451 | 1/2005 |

OTHER PUBLICATIONS

Steuer Brochure titled "Steuer Foil-Jet FBR 104 Rotary Sheet-Fed Foil Stamping" (copied in color and attached).

* cited by examiner

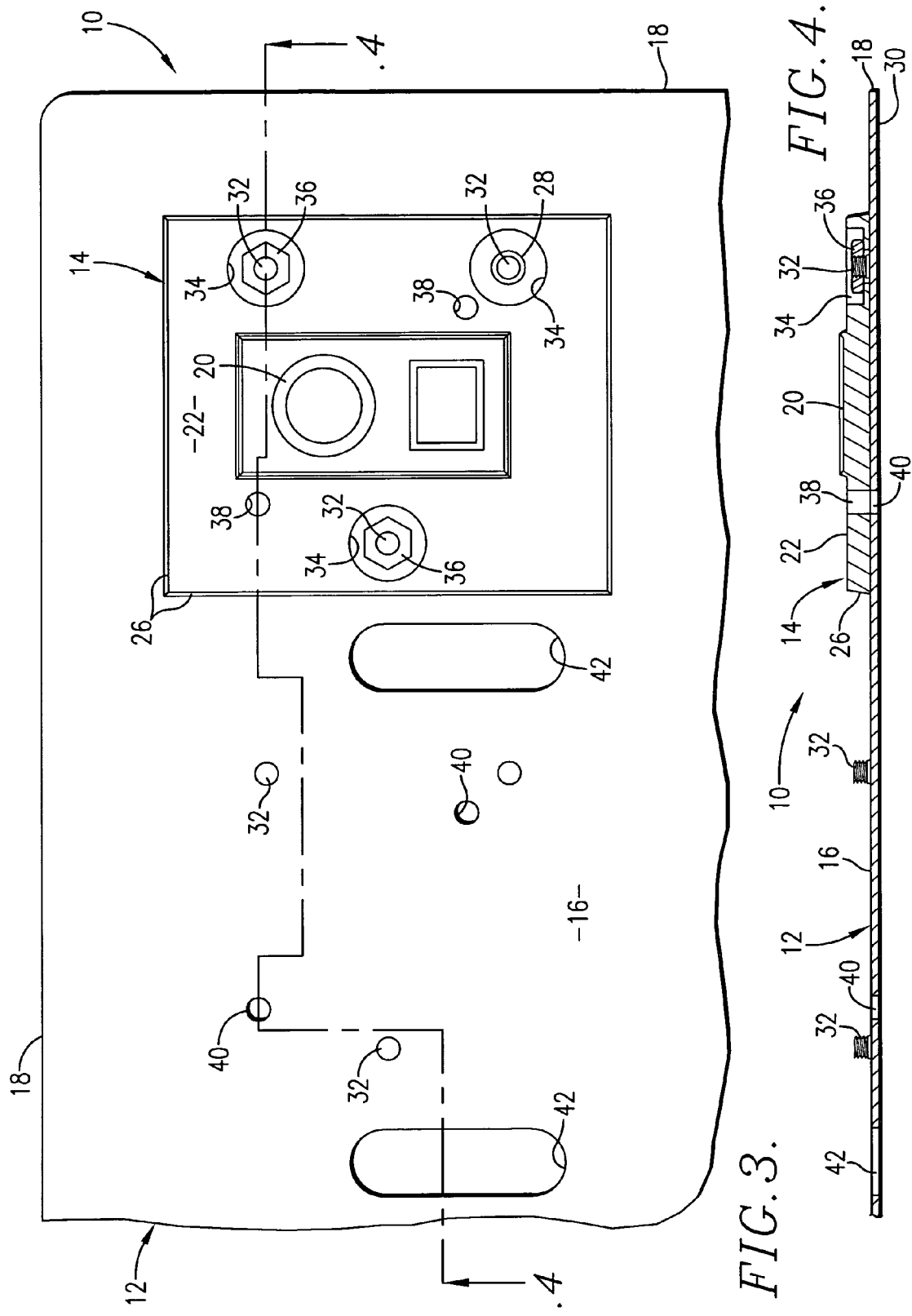

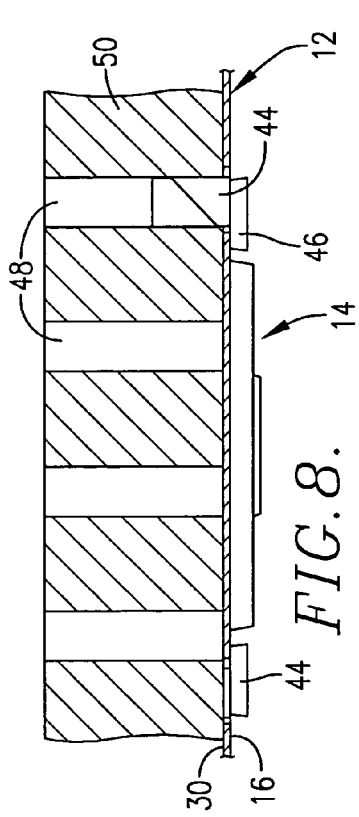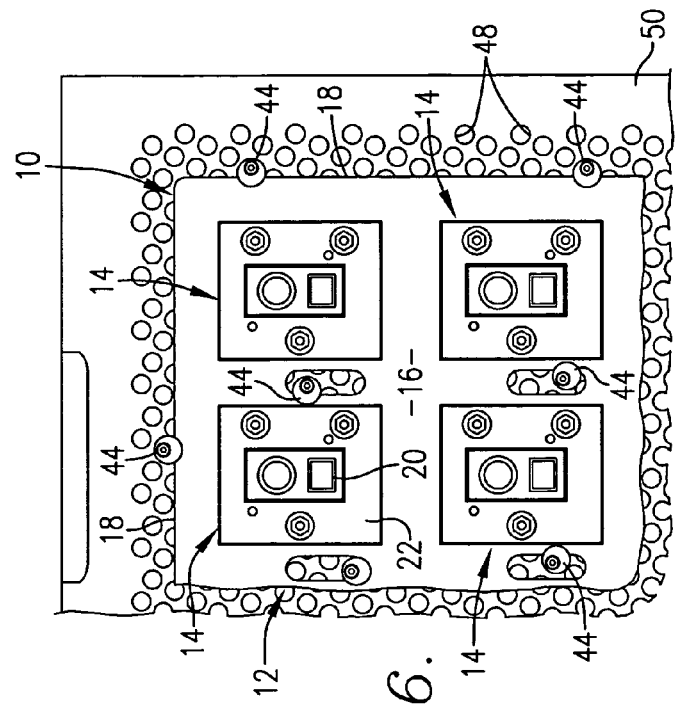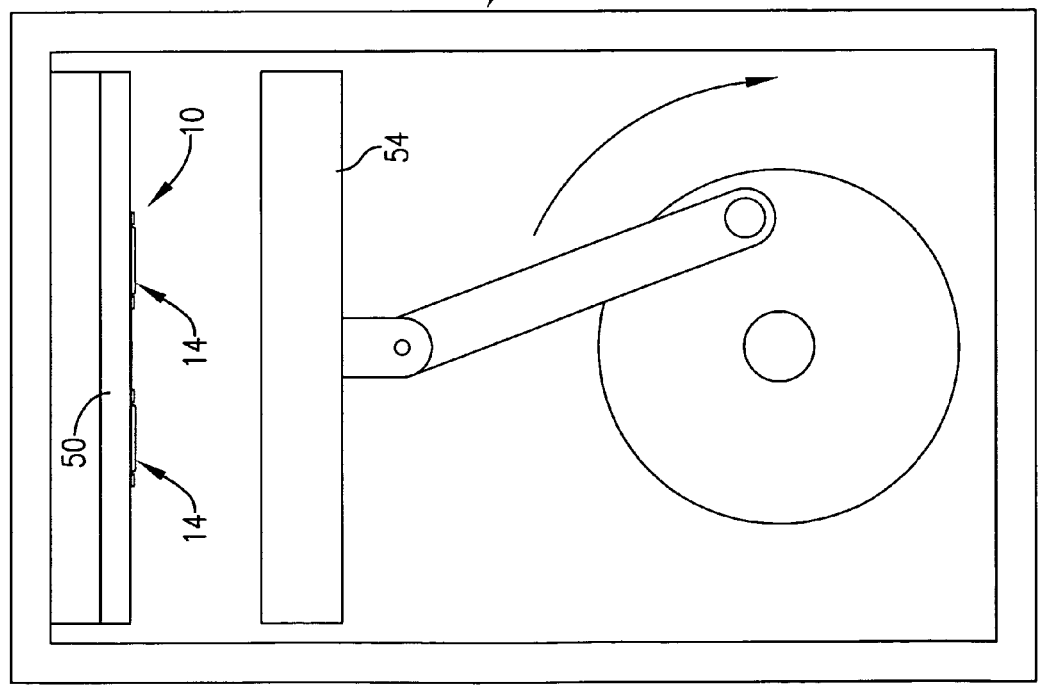

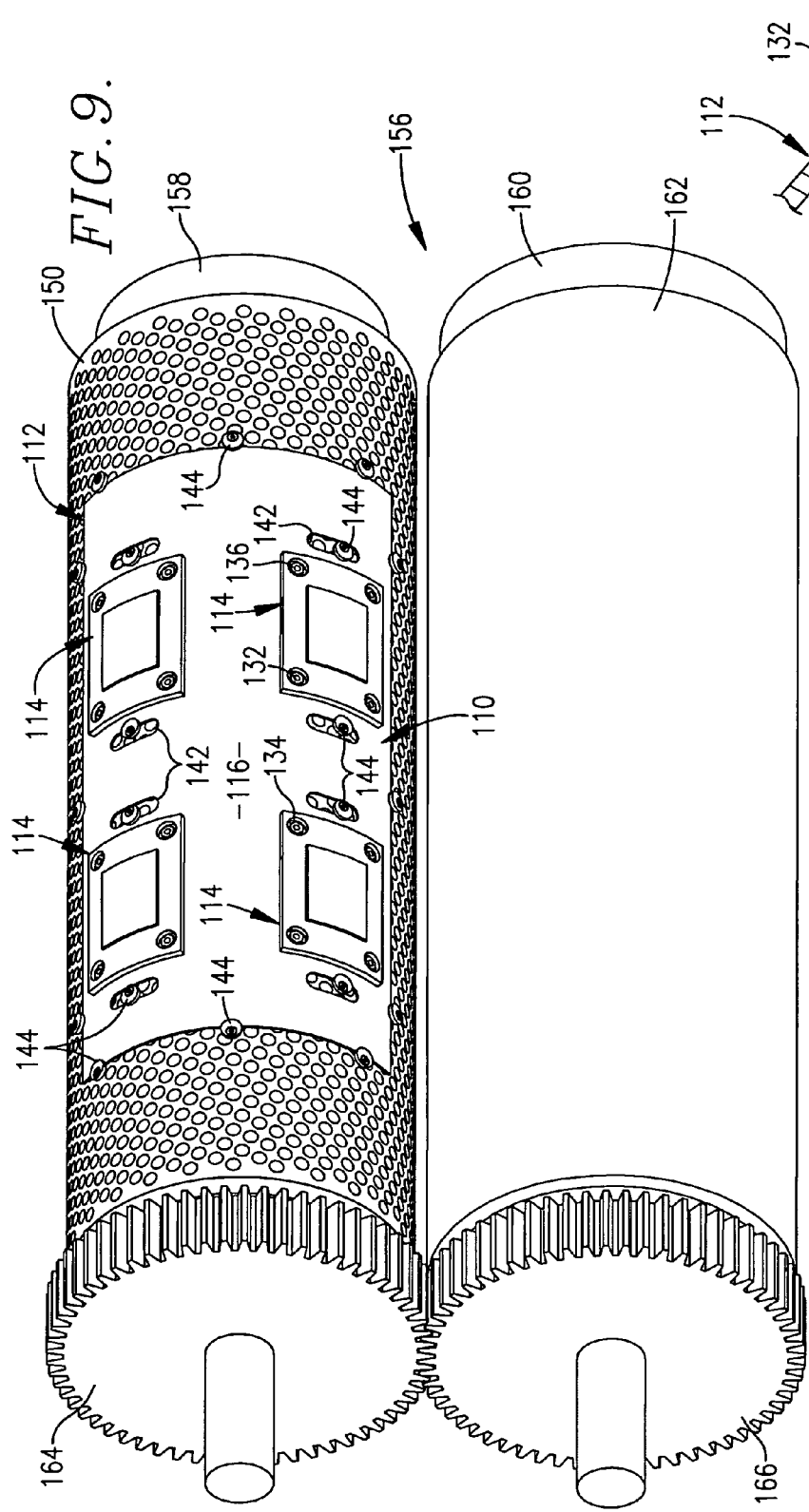
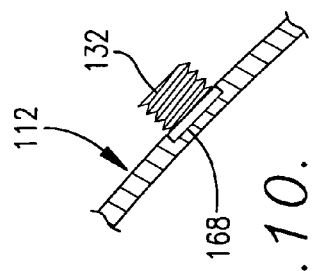

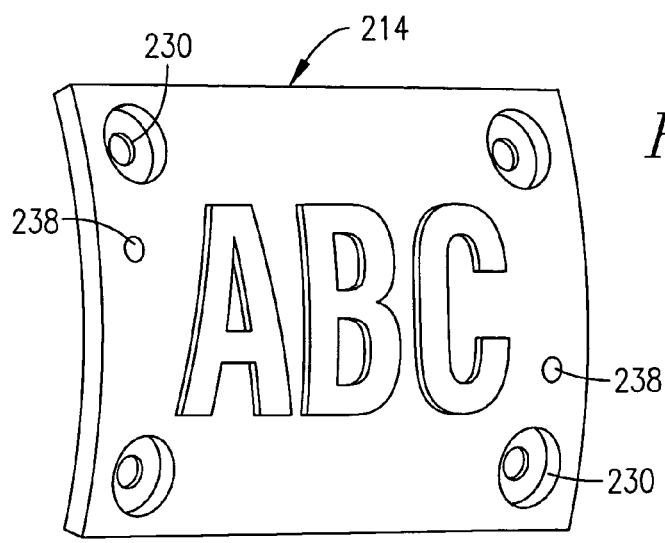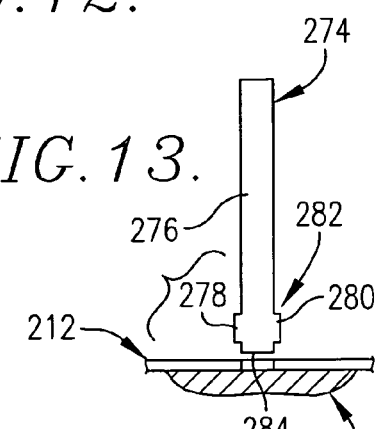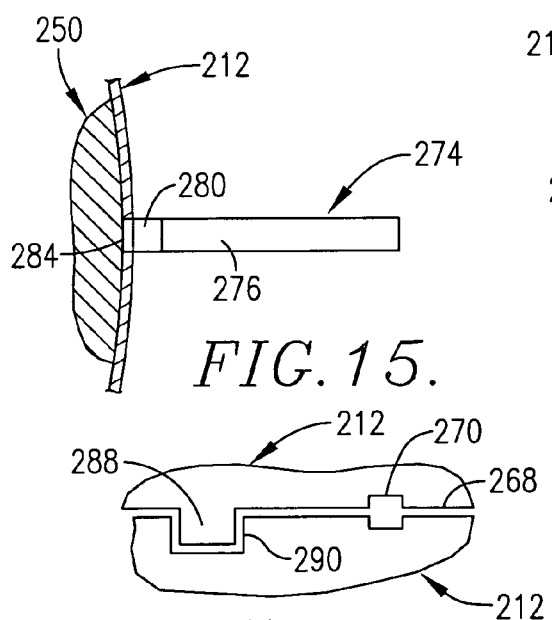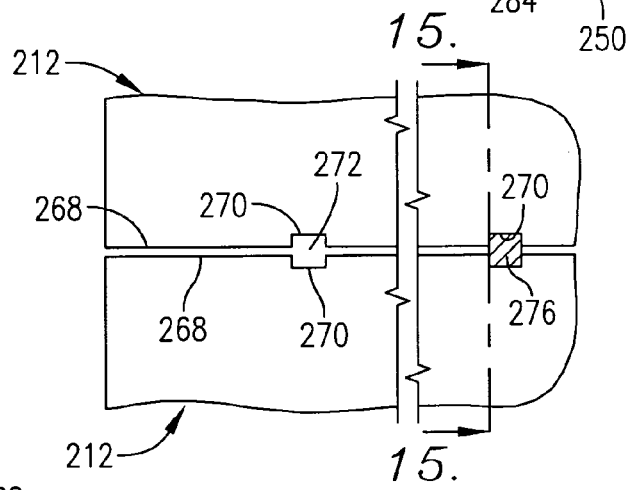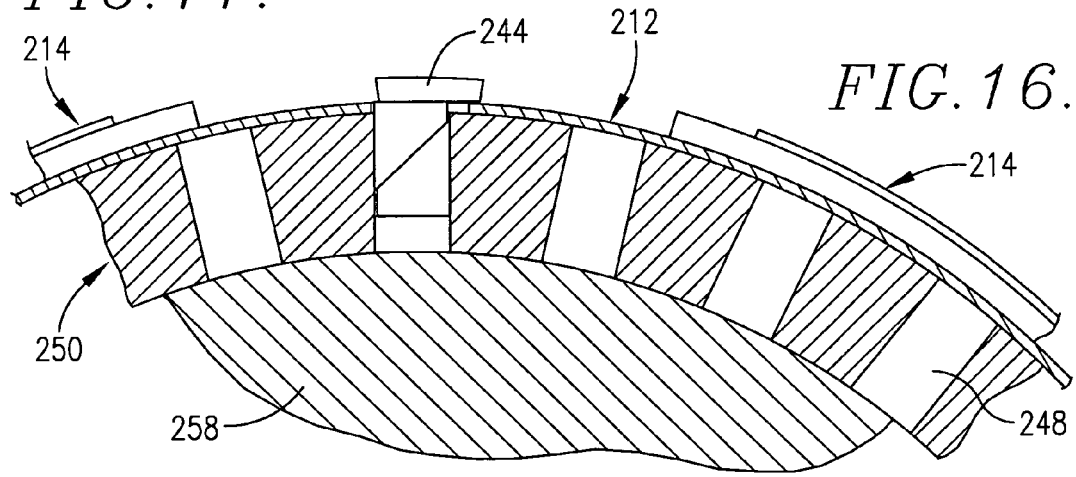

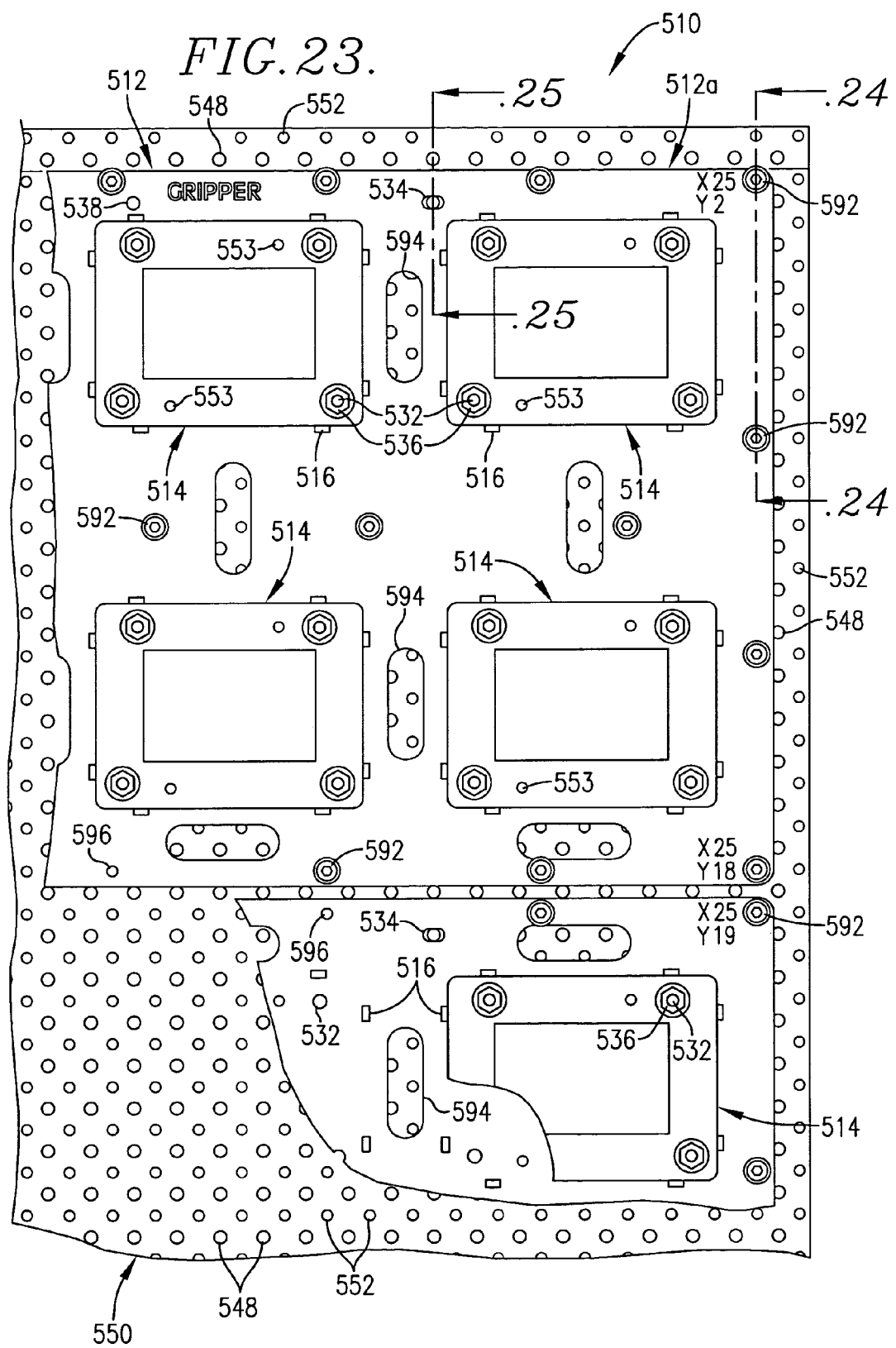

GRAPHIC ARTS DIE AND SUPPORT PLATE ASSEMBLY

RELATED APPLICATION

This application is a continuation-in-part of U.S. patent application Ser. No. 10/851,715, filed May 21, 2004 now abandoned, entitled COMBINATION GRAPHIC ARTS DIE AND SUPPORT ASSEMBLY, incorporated herein by reference.

FIELD OF THE INVENTION

This invention relates to a graphic arts die and support assembly adapted to be mounted as a unit on the platen chase of a flat bed graphic arts press or the chase for the cylinder of a rotary graphic arts press. Each of the dies is fixedly mounted in predetermined relative relationship on a die carrier or mounting plate serving as a support member for the dies. A number of arcuate die carrier plates are provided in instances where the curved die carrier plates and associated curved dies are to be mounted on the cylinder of a rotary graphic arts press in disposition such that the assembly of die plates and dies may extend more than 180° around the circumference of the cylinder. Furthermore, each die may be moved slightly relative to the remaining dies during set up of the press to bring the design defining surface of each die into exact register with artwork for the substrate being processed in the press.

In the case of an assembly of curved die carrier plates and associated curved die units for rotary graphic arts presses, at least one of the die carrier plates is preferably provided with a scribed centering line or other marker indicia. The curved plate having a centering indicia is adapted to be attached to the cylinder of the rotary press in register with a conventional center line on the press cylinder that is equally spaced from the ends of the cylinder. The remaining curved die supporting plates may then be attached to the cylinder based on the position of the registered first attached plate, so that all of the die supporting plates are in proper registration with the center line of the cylinder.

BACKGROUND OF THE PRIOR ART

In conventional stamping, embossing, or die cutting presses, it has long been the practice to provide an apertured chase for mounting the stamping, embossing or die cutting dies on a flat bed press or the apertured chase of a rotary press. Fasteners received in the apertures of the flat bed chase or cylinder chase of a rotary press engage the edge of the die to hold the dies in selected positions on the flat bed or rotary press.

Typical flat bed chases are 22 in. by 28 in., 28 in. by 40 in. or 39 in. by 50 in. in size. These chases are usually from about 0.625 in. to about 2 in. thick steel with closely spaced apertures formed in the chase for receiving fasteners such as toggle devices. Similarly, rotary cylinders for mounting of curved dies generally are in the 8 in. to 12 in. diameter range and have an apertured sleeve chase for the rotary press cylinder, in which the sleeve chase has closely spaced fastener receiving holes. Fasteners are employed to secure a multiplicity of stamping, embossing, or die cutting dies to the die mounting surface of the apertured chases. Each fastener, which is preferably a toggle device, is introduced into an aperture in the flat bed chase or the apertured sleeve chase for the cylinder of a rotary press adjacent to an edge of a respective die and the toggle device expanded with a tool to bring a beveled edge of the hold down device into engagement with a complementally beveled edge of a respective die. Typically as many as six fasteners may be required to secure a rectangular stamping, embossing, or die cutting die to a flat bed press chase or rotary press chase. Chases of the type described typically cost many thousands of dollars. The toggle hold down devices are also relatively expensive and in a typical die set up, there may be a need for as many as 100 fasteners, depending upon the size of the flat bed chase or the diameter of the rotary cylinder chase and the number of dies attached to the flat bed or rotary press.

Set up, also known as lock-up, of foil stamping, embossing, or die cutting dies on an apertured chase, whether flat or cylindrical, is very time consuming. Each of the dies must be oriented on a respective apertured chase in disposition such that the design image of each die correctly and precisely aligns with image design artwork.

Lock-up is accomplished by placing the first of a series of foil stamping, embossing, or die cutting dies on the die support surface of the apertured chase of a flat bed press, or the apertured sleeve for the cylinder of a rotary press in approximately the position where the die image will align with design image artwork. Fasteners in the nature of conventional toggle devices are inserted in the nearest aperture of the flat bed chase or rotary press chase in a position such that an inclined surface of each toggle device is against the inclined edge of the die plate. A certain degree of movement of the die with respect to the chase or cylinder may be accomplished by adjusting the toggle device contained within a particular aperture in the multi-apertured chase.

After the first die plate has been secured to the chase in proper disposition, the entire securement process must be repeated with the next die plate and continued until all of the die plates have been attached to the chase. Manifestly, this is a very expensive procedure from the standpoint of personnel costs, and in certain instances excessive downtime of the press. The lock-up must be carried out in accordance with a successive time consuming step-by-step process of attaching a multiplicity of flat or curved die plates to an apertured chase. In addition, once all of the dies are mounted on its chase, whether it be flat or cylindrical, adjustment of individual stamping, embossing or die cutting may be required to bring respective die images into exact alignment with design image artwork.

Because of the high labor costs involved in lock-up of multiple die stamping, embossing or die cutting dies on flat bed or rotary presses, some press operators elect to dedicate a specific flat or cylindrical chase with dies mounted thereon to a high volume processing operation. The result is that the operator must acquire and keep on hand a number of individual chases with dies in place thereon for a particular job. In view of the high cost of chases and the costs involved in providing a large number of toggle hold down devices for the dies, locked up dedicated flat or cylindrical chases is an expensive but often necessary undertaking.

Cylindrical die supporting plates have been provided for rotary press cylinders, with a plurality of curved dies being attached to the surface of the cylindrical support plate. In order to mount the cylindrical die support plate on the press cylinder, it has been necessary to remove a side plate from the press, which can take as long as four hours and is an expensive, cumbersome, and time-consuming operation. In addition, because of the time involved in make ready of a cylindrical die supporting plate assembly, many press operators have elected to provide a separate cylinder and associated dies for each job, with the pre-madeup cylinders being interchanged as necessary. The costs incurred limited this practice to very large runs in order to fully amortize the labor and equipment expenses.

Alternatively, curved dies have been fabricated and used in the past on rotary press cylinders, but the curved dies were limited to a circumferential arc no greater than 180°, so that the dies could be attached to the surface of the cylinder. This requirement limited the applicability of such arrangement for rotary presses. Given the limitation of a die no greater than 180° in circumference, press operators have mounted a series of individual curved die plates on the press cylinder, which did extend more than 180° around the circumference of the cylinder. The dies had to be individually mounted on the cylinder of the press oriented such that each was in register with respective images on the substrate brought into contact with the dies. This was recognized to be so labor intensive and time-consuming that low volume runs were of limited practicality.

SUMMARY OF THE INVENTION

In accordance with the present invention, a press operator, whether using a flat bed or rotary press, need only provide the engraver with a conventional positive/negative film, or a digital file of the design art work. The film preferably has a line or other indicia mark that is used for registration of the die plate of a flat bed press with the press platen, or the plurality of die plates mounted on the cylindrical chase of a rotary press. The engraver preferably uses the artwork or a digital file thereof to program a CNC machine, which then forms a design image in a metal die plate blank, wherein the design image in the plate conforms to the artwork image. In lieu of CNC milling of the design image in the die blank, an engraver may hand engrave the design image using an outline on the blank that was derived from a digitized file of the design image. The engraver in that instance may use conventional techniques including a hand tool, a grinder, and the like. Other image forming techniques may be used including a conventional pantograph, computer actuated laser engraving, or chemical etching of the design on a die blank that has a resist coating leaving only the area to be etched open for contact by the etchant solution.

The CNC machine, containing a file of the design image art work preferably has a program for preparing a flat or a curved support plate for a multiplicity of the pre-engraved dies, or multiple arcuate support plates that carry one or more curved dies, and for providing aligned openings in the die blank and support plate receiving fasteners which fixedly although adjustably secure the die plates on a respective support member in disposition, wherein all of the dies on a flat support plate are accurately aligned with the original artwork design, or allow curved support plates and dies to be positioned so that the dies are registered with the artwork.

Thus, the engraver may furnish to its customer a completed flat graphic arts die assembly ready to be mounted on the apertured chase of a flat bed press or a multiplicity of curved die carrier plates and arcuate dies that may be mounted on the apertured cylindrical chase of a rotary press. The press operator is therefore not required as in the past to meticulously and successively mount a series of foil stamping, embossing, or die cutting dies on a flat bed chase or rotary press chase. Likewise, dedication of a flat or cylindrical chase with mounted dies thereon for high volume jobs is no longer necessary, thus freeing up chases and thereby decreasing the need for additional chases, and toggles, and significantly reducing make ready of the press for foil stamping, embossing, or die cutting jobs on flat bed as well as rotary presses.

In most foil stamping, embossing, and die cutting jobs, a plurality of dies are provided to stamp, emboss or die cut a multiplicity of design images. Thus, in one embodiment of the invention, the graphic arts die assembly has a number of individual dies mounted in spaced relationship one from another on a support member. The support with the dies thereon is adapted to be mounted as a unit on the chase of a flat bed or the cylindrical chase of a rotary graphic arts press. The individual dies each have a design defining surface conforming to design artwork furnished to the engraver as a positive or negative film or digital file representation of the desired design. The support member for the dies preferably comprises a relatively thin flat metal plate, or a semi-cylindrical plate member, each being sized for mounting on a flat bed chase or a rotary press chase.

In another embodiment of the invention, a plurality of separate curved die carrier plates are provided, each of which has an inner face adapted to complementally engage the cylindrical surface of a rotary press chase. Each of the curved carrier plates is designed to receive one or more complementally configured curved dies. The separate die carriers are each of a curvature less than 180° so that the carriers may be mounted on the rotary press chase without removal of an end plate of the press. Structure is provided for facilitating registration of all of the curved die carriers with respect to one another and with a circumferentially oriented center line of the cylindrical press platen.

The pre-engraved graphic arts dies are mounted on the die receiving surface of the die support carrier member in pre-determined relative positions. Each die has at least two through holes oriented outboard of and in pre-determined relationship with respect to the design defining surface of a respective die. An upstanding die fastener is provided on the die receiving surface of the die support member for each of the through holes with respective fasteners being received in a corresponding through hole. A releasable connector on each fastener engages a respective die for maintaining each die in a fixed position on the die support member.

In a preferred embodiment of the invention, each of the fasteners is a threaded stud welded to the die receiving surface of the support member. The releasable connectors are preferably nuts threaded onto a corresponding fastener. The design defining surface of each die has a cavity therein lined with a respective through hole and configured to receive a corresponding nut threaded onto each fastener.

The support plate also may be provided with one or more hold down slots located adjacent a die. Fastening devices are utilized in association with each hold down slot in disposition engaging the support member at a location surrounding the slot. The fastening devices are adapted to be received in aligned apertures in the flat bed press chase or rotary press cylindrical chase and serve to maintain a central portion of the support member during use of the graphic arts die assembly in close conformity to the surface of the supporting chase during the various operating conditions of a flat bed or rotary press.

Each die is also preferably provided with at least two alignment apertures therein outboard of the design defining surface of the die and that align with the respective orifices in the support member. Thus, by inserting temporary pins or the like in the apertures of each die and introducing the pins into respective orifices in the support member, each die may be maintained in its precise predetermined position on the support plate until the connector nuts are snugged down against the surface of the die plate. Additionally, the provision of the alignment apertures and orifices permit a die to be returned to its original position using the alignment pins if the die has been shifted on or removed from the die support member.

In a preferred procedure for fabrication of the graphic arts die assembly, the design to be engraved in the surface of a respective die is digitized and the digital data used to program a CNC machine. That machine then engraves the design in one surface of a respective die blank. Alternatively, the design may be hand engraved, engraved with a pantograph, laser engraved or chemically etched in accordance with conventional engraving procedures. The program of the CNC machine causes at least two through holes to be drilled in the die outboard of the engraved design, with the holes being precisely located with respect to the engraved design image. The locations of the through holes relative to the design image is digitally stored in the program associated with the CNC machine. The program for the CNC machine also remembers the digital data relating to the same or different engraved images on the series of dies to be mounted on a particular support plate therefor, as well as the relative positions of the through holes in each die.

The CNC machine is programed to shave the outer die receiving surface of a respective support member in order to assure that the surface is precisely parallel with the opposite surface of the support member which engages the flat bed chase. In the case of a rotary cylinder chase, rather than using a CNC machine for surfacing of the die support member, a grinding machine is preferably used to grind the die receiving surface of the support member and thereby provide a die carrier plate of predetermined, specific thickness. Alternatively, the die receiving surface of the support member may be shaved with a CNC machine while the support member is in a flat condition, with the shaved support member then being bent into circular configuration with a conventional roll former. The perimeter edge of the support member is laser cut or machined by the CNC unit in order that the exact location of the edge is maintained in the program memory for the CNC machine. The CNC unit is further programmed to position and weld threaded studs on the die receiving surface of the support member in locations to be received in respective through holes through the dies and to thereby position the dies in precise relationship one with respect to another and relative to the accurately formed edge of the support member. After placement of the dies over corresponding studs, nuts are threaded onto the upper ends of the studs in association with a respective washer, if needed. Each die is provided with cavities in the design defining surface thereof for receiving the nuts threaded onto corresponding studs. Temporary pins are preferably placed through the aligned apertures of the die and respective orifices in the support member to maintain each die in a precise location until the nuts can be applied to corresponding studs and turned down into firm locking engagement with the design defining surface of each die.

Because the perimeter edge of the support member has been accurately machined and the dies positioned on the plate in pre-determined relationship to the edge, the completed die assembly may be mounted on a flat bed press chase using an edge of the support unit as an alignment guide for the graphic arts die assembly with respect to portions of substrate or other material to be foil stamped, embossed, or die cut. When being mounted on a rotary press cylindrical chase, the completed multi-section die assembly may be mounted on the chase using an edge of each support unit as a guide for alignment of adjacent die carrier supports. Notches at the same position in the edges of each of the support units serve as keys for registration of adjacent support carriers, preferably in conjunction with a spacer tool adapted to be received with opposed aligned key notches of adjacent support members.

After use of the graphic arts die assemblies, a single carrier plate supporting a plurality of dies, or multiple die carrier plates with one or more dies can be quickly removed from the flat bed press chase or rotary press chase and other pre-prepared graphic arts die assemblies mounted in place, with minimal make ready being necessary before full press operation. In those instances where slight adjustment of one or more of the dies is found necessary, such adjustment may be quickly and easily accomplished by virtue of the fact that the through holes are slightly larger than the studs therein. Upon loosening of the nuts on the studs for the particular die, the die may be shifted as necessary to bring the design image of the die into precise alignment with the area of the substrate to be foil stamped, embossed, or die cut. Then the nuts can be re-tightened to maintain the die in its newly established position. On the other hand, if it is desired to return a shifted die to its original location, that may be accomplished by loosening the nuts associated with that die, and shifting the die until pins placed in the alignment apertures align with respective orifices in the support member thus assuring that the die has been returned to its original location on the support member.

DESCRIPTION OF THE DRAWINGS

FIG. 3 is a fragmentary, enlarged plan view of the graphic arts die assembly;

FIG. 4 is a horizontal cross-sectional view taken on an irregular line 4—4 through FIG. 3;

FIG. 6 is a fragmentary plan view of one corner of the graphic arts die assembly shown mounted in place on the chase of a flat bed press;

FIG. 7 is a schematic representation of a typical flat bed press and showing one position of the graphic arts die assembly mounted on the chase of the press;

FIG. 8 is an enlarged vertical cross-sectional view through the platen and die assembly of FIG. 7;

FIG. 9 is a perspective view of rotary foil stamping, embossing, or die cutting mechanism, which includes an apertured cylindrical chase on a rotary cylinder and an opposed anvil roller;

FIG. 10 is a fragmentary, enlarged cross-sectional view of one of the studs mounted on the apertured cylinder for securing the semi-circular support member and associated curved die plates to the cylinder;

FIG. 12 is a perspective view of one of the curved dies adapted to be mounted on a respective die support member as illustrated in FIG. 11;

FIG. 13 is an enlarged, schematic cross-sectional representation of one form of tool receivable in opposed alignment notches in the edges of respective die support members that is useful to equally space adjacent die support members mounted on the cylindrical chase of a rotary press;

FIG. 14 is an enlarged fragmentary plan view of two adjacent curved die support members having registration notches in opposed edges thereof that are used in association with the tool of FIG. 13 to register and space adjacent support plates;

FIG. 15 is a schematic vertical cross-sectional view taken substantially on the line 15—15 of FIG. 14 and looking in the direction of the arrows;

FIG. 16 is an enlarged fragmentary vertical cross-sectional view through a rotary cylindrical platen with curved die support plates and associated dies thereon, with the support plates being attached to the outer cylindrical surface of the rotary chase;

FIG. 17 is an alternate embodiment of the multiple die support members in which edges of proximal plates have interlocking tongue and notch structure for aligning adjacent support plates one with respect to the other;

FIG. 23 is an enlarged fragmentary plan view of a graphic arts die assembly provided with a die carrier plate having a number of dies attached to the surface thereof, and specifically adapted to be mounted on a rotary press cylindrical chase provided with alternate rows of threaded openings and smooth bored alignment openings;

Figure 1:
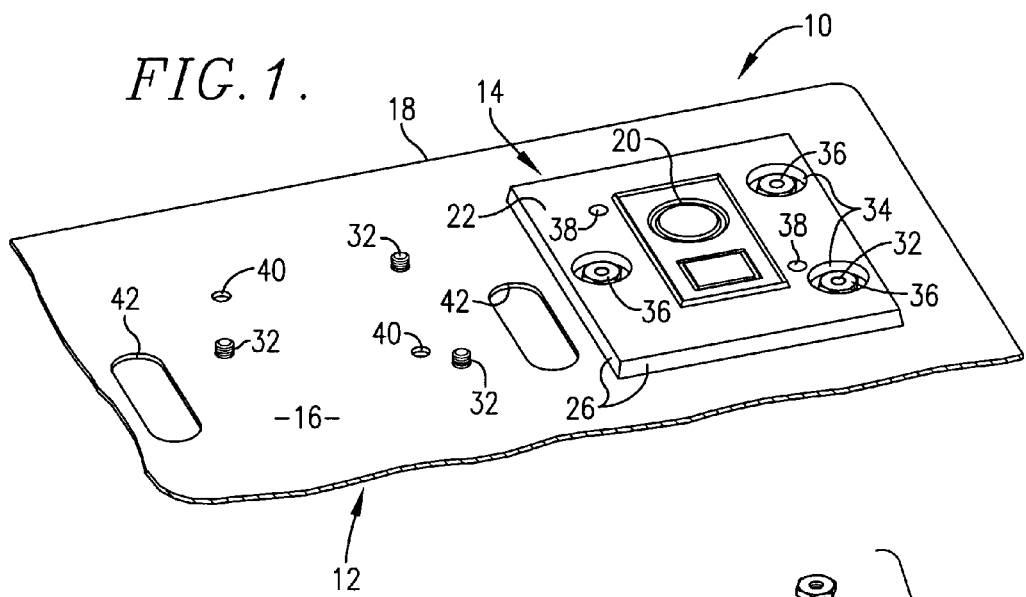
FIG. 1 is a fragmentary perspective view of a graphic arts die assembly in accordance with a preferred embodiment of this invention.
Figure 2:
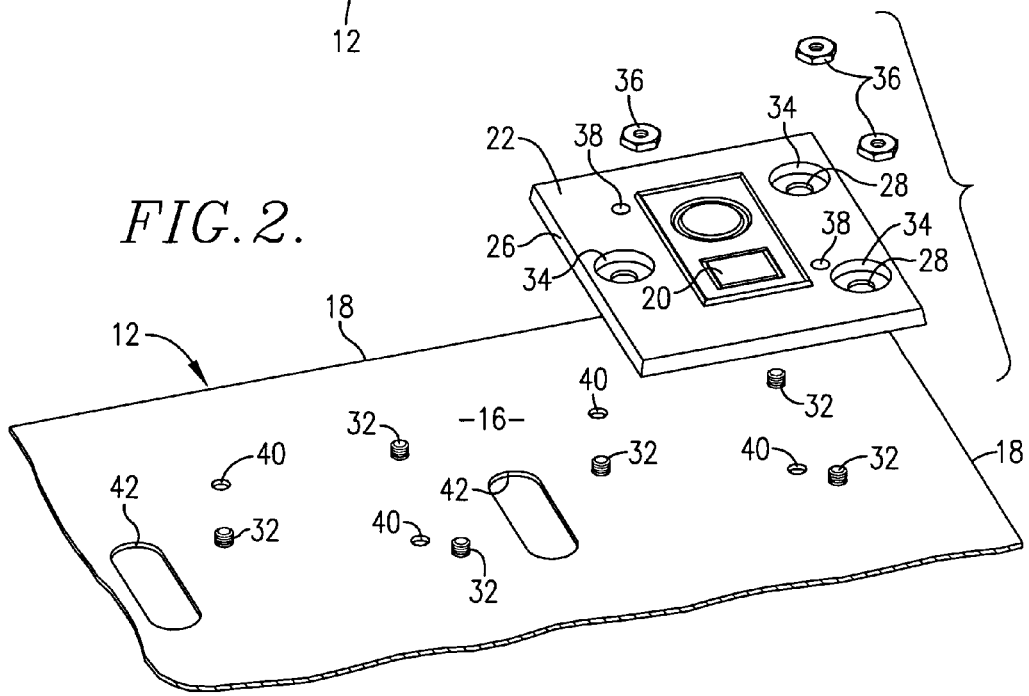
FIG. 2 is a fragmentary, exploded perspective view of components of the graphic arts die assembly as shown in FIG. 1.
Figure 5:
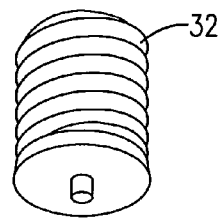
FIG. 5 is an enlarged perspective view of one of the externally threaded studs welded to the support member of the assembly as shown in FIG. 1 and FIG. 2.

DESCRIPTION OF A PREFERRED EMBODIMENTS OF THE INVENTION a. Preferred Embodiment of a Die Carrier Plate for a Plurality of Dies and Adapted to Be Mounted on a Flat Bed Press Chase or Rotary Press Cylindrical Chase.

The graphic arts die assembly broadly designated 10 includes, in a preferred embodiment, a relatively thin flat metal die support member or plate 12. The member 12 has a normally uppermost die receiving flat surface 16 and an opposed flat, chase engaging surface 30. A number of foil stamping, embossing or die cutting dies 14 are selectively mounted on the die receiving surface 16 in predetermined relative relationship, one with respect to the other, and also relative to the perimeter edge 18 of the member 12.

Each of the dies 14 preferably comprises a flat or curved plate having a design defining image 20 engraved in the normally uppermost surface 22 of each die 14. The design image 20 may be formed by hand using suitable hand and/or power operated tools, employing a conventional pantograph machine, laser engraved, or chemically etched. However, in a preferred embodiment of this invention, the design image 20 is formed in the normally uppermost surface 22 of the die 14 utilizing a CNC machine programed to execute engraving of the die plate 14, thus assuring that the engraved image conforms exactly to a design image of a positive or negative film representation, or a digital file of the artwork used for foil stamping, embossing, or die cutting of a substrate sheet or web, or other material.

The CNC machine also mills the outer edge 26 of the die 14 to provide either a vertical or a beveled surface. In addition, the machine edge 26 is in precise disposition with respect to the design defining engraved image 20, or vice versa.

The CNC machine also drills at least two, and preferably three through holes 28 through the thickness of die plate 14, again in precise disposition relative to the engraved image 20 in the upper surface of the die. Through holes 28 are desirably located in relative relationship such that when mounted on the support member 12, the plate can be positioned in only one orientation with reference to the support member 12.

The CNC machine also is controlled by a program that is functional to prepare the support member 12. One function of the CNC machine after the support member 12 has been positioned on the bed of the CNC machine in predetermined disposition, is to shave the entire upper die receiving surface 16 of member 12 so that surface 16, throughout its entire area, is in precise parallelism with the opposed chase engaging surface 30 of member 12. The outer surface of a curved die carrier support is preferably ground to provide a die support plate of predetermined thickness having equally spaced outer surfaces using a conventional grinding machine. This grinding operation assures that the plate is of uniform and prescribed thickness throughout the extent thereof. When the curved die carrier support is fabricated from an initially flat plate, a CNC machine is used to shave the die receiving surface of the die carrier support, and the shaved plate is then bent into circular configuration by a conventional roll former. The program for the CNC machine also is operable to mill the perimeter edge of the member 12 and to store in the program memory the location of the edge with respect to the exact center point of member 12. In lieu of using the CNC machine to mill a perimeter age of the member 12, the CNC machine may be programmed to control a laser cutter that precisely cuts the edge of member 12.

A third function of the program for the CNC machine is to accurately position and weld a series of externally welded studs 32 to the die receiving surface 16 of member 12. An example of a suitable capacity discharge stud positioner and welder is available from Cutlass Fasteners Inc. as its "Cutlass Classic". The stud positioner and fastener mounted on the spindle of the CNC machine is used to hold each stud, position one end of a respective threaded stud against the die receiving surface 16 of die support member 12 in a predetermined position established by the program of the CNC machine, and to effect welding of the stud to the support member. Welding time for each stud is normally no more than about 20 seconds. The predetermined location of the studs is controlled by the program of the CNC machine so that the studs will align with the through holes 28 of respective dies 14, and so that the dies are positioned such that the engraved surfaces 20 thereof are aligned with the design of the artwork representation on the positive or negative film, or digital file of the design. Thus, there is one stud 32 for each through hole 28, and the axis of each stud 32 is aligned with the axis of a respective through hole 28. The studs 32 may be of various materials including suitable synthetic resin compositions, and preferably metals. A most preferred material is steel with a coating of copper. Each stud 32 may for example have a 10-32 thread.

The design engraved surface 22 of each die 14 has a counter bored cavity 34 coaxial with a respective through hole 28. The cavities 34 are of sufficient diameter to clear an internally threaded nut 36 removably threaded over a respective stud 32 after a corresponding die plate 14 has been placed on the die receiving surface 16 of support plate member 12. As is evident from FIG. 4, the nuts 36 are each of limited height such that when threaded over corresponding studs 32 and brought into engagement with the plate 14 at the bottom of cavities 34, the uppermost surface of each nut is below the unengraved surface of the die plate 14. The CNC machine is also programmed to shave off excess material from the upper end of each of the studs 32 so that the upper extremity of each stud likewise is below the adjacent upper surface of die plate 14. The same procedure is used in the case of fabrication of a curved support plate for a rotary press platen wherein a computer program, except that the program functions to convert the flat engraved image surfaces into altered cylindrical image surfaces that correspond to the requisite flat image on a substrate brought into engagement with the curved die.

After hand, pantograph, laser or etch engraving of the die blank, or during engraving of each die plate 14 by the programmed CNC machine and drilling of through holes 28, the CNC machine also drills at least two alignment apertures 38 in the plate 14 outboard of the engraved image 20 of the die plate. The support plate program for the CNC machine drills orifices 40 in the support member 12 that directly align with apertures 38 in a respective die plate 14. Thus, the program for the CNC machine is functional to locate apertures 38 and corresponding orifices 40 in positions correlated and coordinated with the design on the film positive, negative or digital file representation of the design to be foil stamped, embossed or die cut. Similarly, the program that converts flat surface representations to rotary surface representations is utilized to compensate for the rotary die surface as opposed to a flat die surface.

It is preferred that the program for the CNC machine also mill a series of hold down slots 42 in support member 12 in disposition such that the slots do not underlie one of the die plates 14 positioned on and secured to support member 12. Each slot is adapted to receive a toggle device 44 or other equivalent fastener that serves to firmly hold the portion of the support member 12 surrounding a respective slot firmly against a flat bed press chase or rotary press chase on which the support plate 12 is mounted, with two fasteners such as toggle devices 44 preferably being provided at opposite ends of the elongated slots 42. As can be seen from FIG. 6, each toggle device 44 has an uppermost, eccentrically located disc portion 46 configured to overlie and engage an adjacent segment of the slot in the support member. The toggle devices 44 are adapted to be received in an adjacent aperture 48 of the chase 50 on which the assembly 10 is mounted. The body of the toggle device 44 received in a respective aperture 48 of chase 50 and preferably has end-to-end components as shown in FIG. 8 presenting interengaging beveled surfaces such that when the length of the device is decreased by turning of a suitable connecting screw to move the components toward one another, the result is an increase in the effective diameter of the toggle device so that it is locked in a respective aperture 48 and will not move with respect to the chase 50. It can also be seen from FIG. 6 that toggle devices 44 are useful to hold down the perimeter of support member 12 by virtue of the fact that the disc portion of each toggle device lays over and engages the perimeter edge of support member 12.

As is evident from FIG. 7, chase 50 is a normally stationary part of, for example, a flat bed press 52 having a reciprocable platen 54 moveable toward and away from the chase 50 as sheets to be foil stamped, embossed or die cut are inserted therebetween.

After engraving, edge milling and drilling of each of the die plates 14, and following surface shaving, edge and slot milling, and stud welding of the support plate 12, the individual die plates 14 are placed over respective studs, alignment pins are introduced into aligned apertures 38 and orifices 40, and nuts 36 are threaded over respective studs 32 until the nuts are in firm engagement with each die plate 14 at the bottom of cavities 34. The alignment pins may thereupon be removed from aligned apertures 38 and orifices 40. The completed graphic arts die assembly 10 is ready to be shipped to a user. The operator of a flat bed stamping, embossing or die cutting press may mount the flat assembly 10 shown in FIGS. 1–8 of the drawings, directly on the chase of the flat bed press. The edge 18 of the support member 12 may be used as a guide for location of the assembly 10 in view of the fact that the edge 18 is precisely located with respect to the center point of support member 12, with the individual dies 14 being precisely positioned with respect to that center point of the support member 12. If adjustment of any of the die plates 14 is required during make ready of the press because of differences in substrate, processing conditions such as humidity in the press area affecting the substrate, or other factors often encountered in processing operations, die adjustment may be easily accomplished without removing the dies from the support member 12. All that is required is loosening of nuts 36, incremental shifting of the die plate, followed by re-tightening of nuts 36.

Rotary press components forming a part of a rotary foil stamping, embossing, or die cutting press are shown in FIG. 9 and are broadly designated by the numeral 156. The cylindrical chase 150 mounted on roller 158 has a plurality of apertures 148 similar to the apertures 48 of chase 50. The chase 150 is in direct opposition and mates with an anvil roller 160 which may have a blanket roll 162. Conventional intermeshing gears 164 and 166 at the ends of cylinder 158 and roller 160 respectively are provided to effect rotation of cylinder 158 and roller 160 from a single drive shaft.

The semi-cylindrical support member 112 of the die assembly 110 is preferably made from a steel tube. This tube is ground to a desired thickness of for example 0.060 in., after which the CNC program is used to control a laser cutting machine to cut the final die support member. The semi-cylindrical die support member 112 may also be fabricated from a flat steel plate that is shaved to desired uniform thickness and then bent into circular configuration with conventional roll forming equipment. The support member 112 may be prepared from a tube as described, or constructed from a flat member that is shaved with a CNC machine. A flat surfaced support member is then bent with a die former into circular configuration. The curved die plates 114 are also of identical construction to plates 14 with the exception that each die plate 114 is preferably fabricated from a metal cylinder of a diameter generally of the same diameter as the exterior face of chase 150. A semi-cylindrical segment blank is cut from a metal cylinder such as brass, copper, steel, magnesium, zinc, or other engravable material having dimensions slightly larger than the final die plate. If, for example, the metal cylinder used has a thickness of about ½ in., the thickness of the segment blank is reduced to approximately ¼ in. by the CNC machine in the same operation that the design image is formed in the outermost face of the metal blank. The normally innermost surface of the curved die plate is machined with precision so that it will closely conform with the outer curved die supporting surface of the semi-cylindrical support member 112.

The CNC machine is also programmed to form through holes in each of the die plates 114 similar to the through holes 28 in die plate 14, and to form alignment holes in each of the die plates 114 outboard of the image defining design surface of each curved die plate. The through holes in die plates 114 align with orifices in support member 112 similar to orifices 40 in support plate 12. The through holes formed in each die plate 114 are coaxial with nut clearing cavities 134 in the outer design defining surface of each die plate 114.

The CNC machine is programmed to weld a series of studs 132 to the outer design receiving surface 116 of support plate 112 in disposition such that the studs 132 will be in coaxial alignment with respective through holes in the die plates 114 when the die plates are mounted in respective positions on support plate 112.

As can be observed in FIG. 10, the die receiving surface 116 of the support number 112 may have a circular recess 168 for each stud 132 with the lowermost extremity of each stud 132 being positioned within a corresponding recess. Welding of studs 132 while inserted into a corresponding recess 168 increases the physical connection of each stud 132 to the support member 112, so that the studs are better able to withstand tortional forces imparted to the studs during rotation of the cylinder 158 supporting chase 150.

In alternate embodiments of the support plate 112, each stud 132 may be secured to the support plate 112 by press fitting each stud from the back of the support plate 112 through a complemental opening in support plate 112. The part of the studs 132 extending through member 112 may have enlarged conical heads complementally received in corresponding conical hole segments of the support member 112 to further increase the holding power of each stud 132. Cylindrical studs extending through the support member 112, or the conical headed studs 132 may, if desired, be welded, braised, or chemically bonded as with an adhesive to the support member 112. The upper extremities of each of the studs 132 should be shaved if necessary so that the upper end of each stud does not project above the outer design defining surface of a respective die plate 114.

Toggle devices 144, preferably of the same construction as toggle devices 44, are received in respective slots 142 in support member 112. One toggle device 144 is illustrated in each of the slots 142 in FIG. 10, as being representative, but it is to be understood that in preferred construction, two toggle devices 144 will be provided in a respective slot 142, with the toggle devices 144 being located at corresponding ends of slots 142. To that end, the support member 112 is positioned such that the toggle devices will be received in a respective aperture in the chase 150. Toggle devices 144 function in the same manner as toggle devices 44 in slots 42 of support member 12 to hold the interior portion of support member 112 in firm contact with chase 150. Additional toggle devices 144 received in respective apertures of chase 150 are used to attach the peripheral edge of support member 112 to the curved surface of chase 150.

The individual die plates 114 are placed on curved support member 112 with the studs 132 received in respective through holes in corresponding die plates 114. Pins are temporarily inserted through the alignment holes in die plates 114 and the alignment apertures in support member 112. Nuts 136 are threaded on each stud 132 and tightened against the outer surface of each die plate 114 within respective cavities 134. The curved die plate and support member assembly is ready to be delivered to a customer for mounting as a unit on the cylindrical chase 150 of the rotary press. Limited movement of each of the die plates 114 for final registration of each die plate is permitted upon loosening of respective nuts 136, and the nuts all retightened after a respective die plate has been repositioned to a desired registered location.

The operation of the rotary press is essentially the same as described with respect to the flat bed press, with the exception that a substrate web is fed to the rotary press instead of individual sheets being fed to the flat bed press.

Makeready time for a rotary press set up to foil stamp, emboss or die cut is substantially reduced as compared with a conventional rotary press because of the provision of a preshaped curved support member and a preformed semi-circular die plate releasably and removably affixed to the support members. Significantly less operator time is required to prepare a rotary press for foil stamping, embossing or die cutting using the present invention, because the dies are all mounted as a unit on the support member while being maintained in proper registration relative to one another.

EXAMPLE

In accordance with the present invention the support member 12 is preferably a steel plate in which the die receiving surface 16 has been shaved in a milling machine such that the plate thickness is from about 0.030 in. to about 0.100 in. thick, more preferably from about 0.040 in. to about 0.090 in., and most preferably 0.060 in. The thickness of the die plate 14 should be in the range of from about 0.150 in. to about 0.220 in., more preferably from about 0.160 in. to about 0.210 in. and most preferably about 0.190 in. The overall thickness of assembly 10 is most preferably about 0.250 in., in order to comply with industry practice in North America that a foil stamping, embossing or die cutting plate should be no more than about 0.250 in. thick. In the instance of foreign press operations, the total overall thickness of assembly 10 should typically be no more than about 7 mm. in accordance with foreign foil stamping, embossing and die cutting industry practice. In lieu of being made of steel, the support member 12 may be fabricated from a metal other than carbon steel, e.g. copper, brass, titanium, or stainless steel. Cladded metal plate material comprising two metal layers, including respective layers of copper, brass, zinc, and magnesium combined with a different metal such as steel may be used in which one layer of a metal is utilized with a different metal. Utilization of a cladded metal plate for fabrication of support member 12 has the advantage that because of the manner in which cladded metal sheets are produced by passage of the metal overlying layers between rollers which apply very high pressures to the laminated plate material. The opposing surfaces of the resultant cladded metal plate are in very precise parallelism, thus in most instances negating the necessity of shaving one surface of the plate material used to fabricate the support member.

Preferably each of the through holes 28 is approximately from about 0.200 in. to about 0.270 in. and preferably about 0.250 in. in diameter while each stud has a diameter of about 0.187 in. and is about 0.140 in. in height. The nuts 36 are the diameter of a standard ⅜ in. nut, have 10-32 threads, and are 0.095 in. thick. Cavities 34 are counter bored to a depth of at least 0.100 in. It is preferred in this respect that the dimensions of the through holes 28 and studs 32 be correlated such that the die plate 14 may move in all directions a distance relative to the studs 32 therein within the range of about 0.010 in. to about 0.050 in., and preferably about 0.030 in.

The die plate 14 may be any ferrous or non-ferrous metal including copper, zinc, magnesium, aluminum, steel, brass, or a composite material including thermoplastic and thermoset resins. Although, copper coated steel studs are preferred, the studs may also be fabricated of any ferrous or non-ferrous weldable material including stainless steel or copper. In lieu of welding the individual studs to the support member for the die plate, the studs may be threaded elements that are press fitted, adhesively bonded or chemically bonded to the support member 12. Another alternative for studs 32 are posts having means such as a groove in the upper end thereof for receipt of an annular fastener. Preferably there should be a stud 32 for every four to seven square inches of an engraved die, with a minimum of two studs per die.

In the case of a die assembly 110 for use on a rotary press the thickness of the support member 112, nominally should range from about 0.030 in. to about 0.100 in., more preferably from about 0.040 in. to about 0.090 in., and most preferably about 0.060 in. The thickness of the die plate 114 should be from about 0.163 in. to about 0.233 in., more preferably from about 0.173 in. to about 0.233 in. and most preferably about 0.203 in. The overall thickness of the combination of the support member 112 and a respective die 114 is most preferably about 0.263 in.

Use by a press operator of the present graphic arts assembly 10 or 112 in lieu of preexisting lock-up procedures for foil stamping, embossing or die cutting dies individually mounted directly on a flat bed chase or rotary cylinder chase can reduce lock-up time by as much as 400% or more, thus decreasing not only make ready time but also significantly lowering the cost of die lock-up and press make ready.

b. Preferred Embodiments of a Series of Curved Die Carrier Plates for One or More Curved Dies and Adapted to Be Mounted on a Rotary Press Cylindrical Chase.

Figure 11:
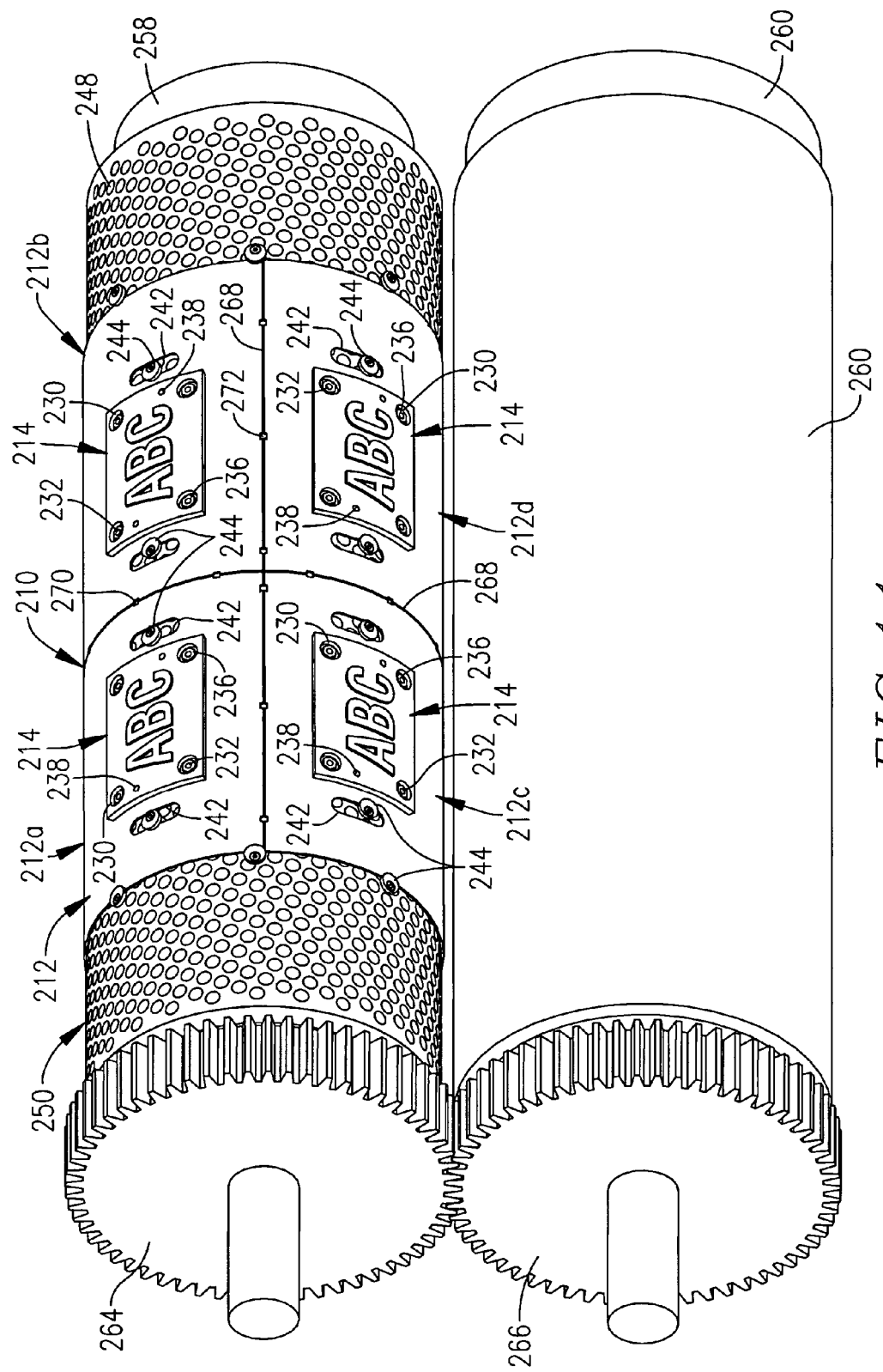
FIG. 11 is a perspective view of rotary press structure as shown in FIG. 9, but in this instance mounting a plurality of separate die carriers, which collectively wrap around the chase of the rotary platen more than 180°.

The cylindrical chase 250 illustrated in FIG. 11 of the drawings mounted on roller 258 is similar to the chase 150 as shown in FIG. 9, and has a large number of smooth bored apertures 248 around the circumference of the chase. The chase 250 is adapted to run in opposition to blanket roll 262 carried by anvil roller 260. Conventional intermeshing gears 264 and 266 at the ends of roller 258 and roller 260 respectively effect rotation of cylindrical chase 250 and blanket roll 262 in unison from a single drive shaft.

The die support assembly unit 210 comprises a plurality of curved die support plate members 212 that receive at least one arcuate die 214 complementally attached to the outer surface of a respective support plate 212. Although the die support plates 212 of FIG. 11 have only one die 214 thereon, it is to be understood that a multiplicity of dies 214 may be provided on each die support plate 212 depending upon the number of images in the artwork design. Furthermore, although the die support plates 212 shown in FIG. 11 are of the same width in a direction circumferentially of the chase 250. It is to be understood, though, that the die support plates 212 may each be of varying circumferential width and longitudinal length, provided that required registration is maintained between the die support plates 212 and with respect to the chase 250.

Each of the die support plates 212 are secured to the cylindrical chase 250 in the same manner as the components for releasably affixing the support plate 112 to the periphery of chase 150 as shown in FIG. 9. Thus, each die plate 212 is preferably provided with at least a pair of elongated slots 242 adjacent proximal opposed margins of respective support plates 212. Fasteners 244, similar to toggle devices 44 and 144, are used to releasably affix the die support plates 212 to cylindrical chase 250. Each of the toggle devices 244 is designed to be received within a corresponding aperture 248 in chase 250. Although only one toggle device 244 is shown in each of the slots 242 in FIG. 11, it again is to be understood that in a preferred arrangement, two toggle devices 244 will be provided for each slot 242, with the toggle devices 244 being located at respective opposite ends of corresponding slots 242. It can be seen in FIG. 11, that a toggle device 244 is provided in each of the slots 242, while other toggle devices 244 engage the opposed outermost edges of the die support plates 212.

Fasteners 244, which are the same as or similar to fasteners 144 and that secure die support plate 112 to chase 150, are provided for attaching die support plates 212 to chase 250. It can be seen from FIG. 11 that each of the die plates 214 has a plurality of openings 230 that receive respective studs 232 constructed and mounted in a manner as described with respect to studs 32 mounted on support plate 12. Nuts 236 are threaded over the outermost ends of studs 232. The artwork template or film that is used to program the equipment for fabrication of each support plate 212 by drilling holes such as holes 40 illustrated in FIG. 2, that are locating apertures for positioning of the dies 214 on respective support plates 212. At least two alignment apertures 238 are provided in each of the die support plates 212 for temporary receipt of an alignment pin that is adapted to be complementally received in a corresponding alignment aperture, such as holes 40, formed in each support plate 212. Nuts 236 are tightened down after each die 214 is oriented in its proper position by use of the alignment pins, whereupon the pins are removed from the apertures 238 and underlying holes 40.

The metal material used and the steps for fabricating support plates 212 and dies 214 are the same as previously described with respect to plates 12 and 112. Thus, as described with respect to plates 12 and 112, and based on the artwork template or film provided by the user of the die plate assemblies, the location of the alignment apertures in support plates 212 and corresponding alignment apertures 238 in support plates 212 are determined and appropriate holes drilled in the plates 212 and the dies 214. Similarly, the artwork template or film is used to determine the location of the openings 230 which receive studs 232 for affixation of the dies 214 to respective semi-cylindrical support plates 212.

As shown in FIGS. 11 and 14, the margins 268 of each die support plate 212 that are opposed and adjacent to one another as mounted on the cylindrical chase 250, have rectangular notches 270 of the same shape and size. From FIG. 11 it can be seen that there are at least two notches in each margin 268 of the die support plates 212, while three or more notches 270 may be provided in the longer margins of die support plates 212, depending upon the length of a respective plate 212. Each of the notches 270 defines a rectangular opening 272. The notches 270 in respective edges of the die support plates 212 are located such that a pair of notches 270 of adjacent die support plates 212 are adapted to align and cooperate to define a rectangular opening 272 that is adapted to receive the operating end of a spacing and alignment tool 274. From FIGS. 13–15, it can be seen that the tool 274 has an elongated stem 276 that is rectangular in cross-section. The lowermost end of the stem 276 has two opposed, unitary, outwardly-directed rectangular projections 278 and 280 that define a spacing head 282. It is to be seen from FIG. 13, that the head 282 is spaced above the bottom surface 284 of the stem 276 of stem 274. The length of the stem 274 below head 282 is preferably slightly less than the thickness of the plate 212 so that bottom surface 284 of stem 276 does not contact the face of cylindrical chase 250. It is also preferred that a plurality of the tools 274 be provided, with a minimum of two tools 274 being available.

Figure 26:
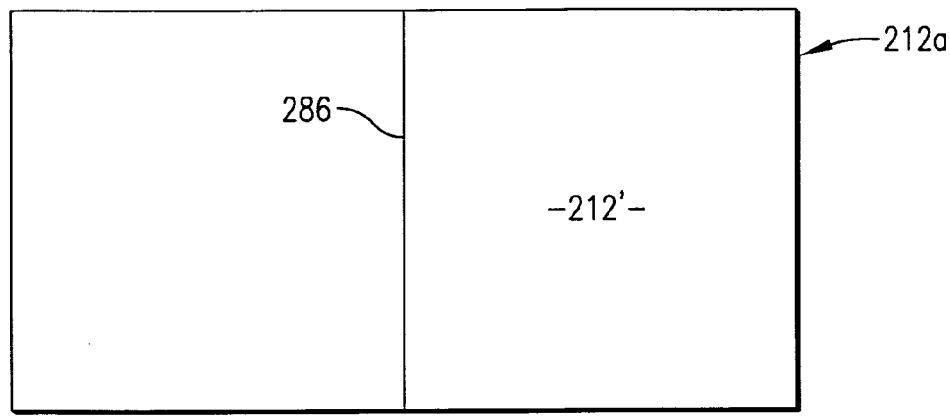
FIGS. 26, 27, and 28 are schematic plan views of a die carrier support member illustrating the position of registration lines or indicia on the surface thereof that are useful in facilitating alignment of respective die support plates with a circumferentially disposed center line mark of a rotary press platen.

FIG. 26 is a schematic representation of one of the die support plates 212*a* illustrated as a flat plate for simplicity, although it is to be understood that the plate will be of arcuate configuration as shown in FIG. 11. The plate 212*a* preferably has a registration line 286 scribed in what will be the outer surface 212' of the plate. The line 286 is used for alignment of the plate 212*a* with a similar scribed, circumferentially extending line or marker in the outer face of cylindrical chase 250 when the plate 212*a* is attached to chase 250. It is required that only one of the die support plates 212, designated as plate 212*a* in FIG. 26, be provided with a registration line or marker.

The program that fabricates the die support plate 212*a* and that scribes the line 286 in a predetermined position on the plate 212*a*, also locates the openings 238 for alignment of dies 214 on plate 212*a*, so that when an individual die 214 is attached to the plate 212*a*, or in the alternative a plurality of dies are mounted on plate 212*a*, the dies are thereby registered with the line 286 and similarly with respect to the center line of the cylindrical chase 250. The remaining die support plates 212 mounted on the cylindrical chase 250 in association with the plate 212*a*, are aligned with plate 212 using tools 274 positioned in respective openings 272 defined by opposed aligned notches 270. Viewing FIG. 11, if the die support plate 212*a* is the support plate in the upper left hand quadrant of the four plates, and the die support plate 212*a* has been secured to the cylindrical chase 250 using toggle devices 244, the die support plate 212*b* in the upper right hand quadrant of FIG. 11 is positioned in registration with plate 212*a* by placement of the head 282 of each of the tools 274 in a corresponding opening 272 of aligned notches 270. As previously noted, the tools 274 serve to not only align the plate 212*b* with plate 212*a*, both circumferentially and axially of the cylindrical chase 250, but also maintain a predetermined space between plate 212*a* and plate 212*b*. This spacing between the adjacent plates 212*a* and 212*b* compensates for expansion of the plates 212 upon heating of the press cylinder, while maintaining the dies 214 in registration with the images on the substrate passed between the two cylinders of a press. The plate 212*c* is aligned with plate 212*a* using tools 274 in the manner previously described, whereupon plate 212*d* is aligned with plates 212*b* and 212*c*, again using tool 274. Each of the plates 212*b*, 212*c*, and 212*d* are secured to the cylindrical chase 250 with respective toggle devices 244. The sequence of alignment and attachment of plates 212*b*, 212*c*, and 212*d* to the cylindrical chase 250 may be changed as desired by the press operator.

Figure 27:
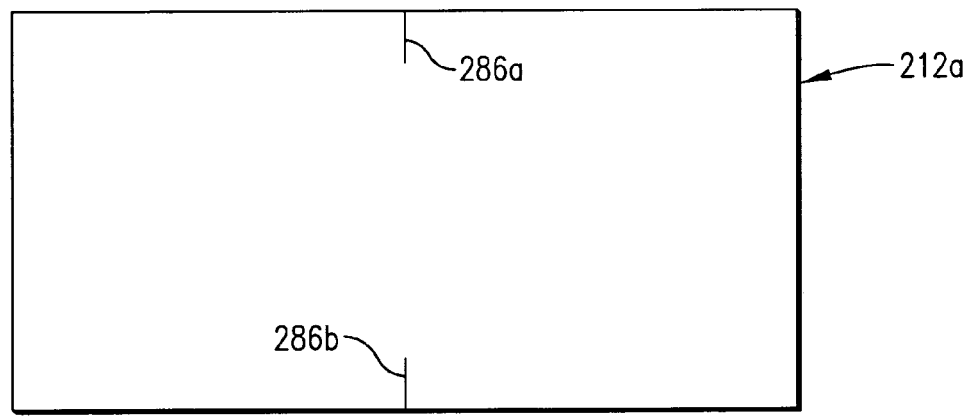
Figure 28:
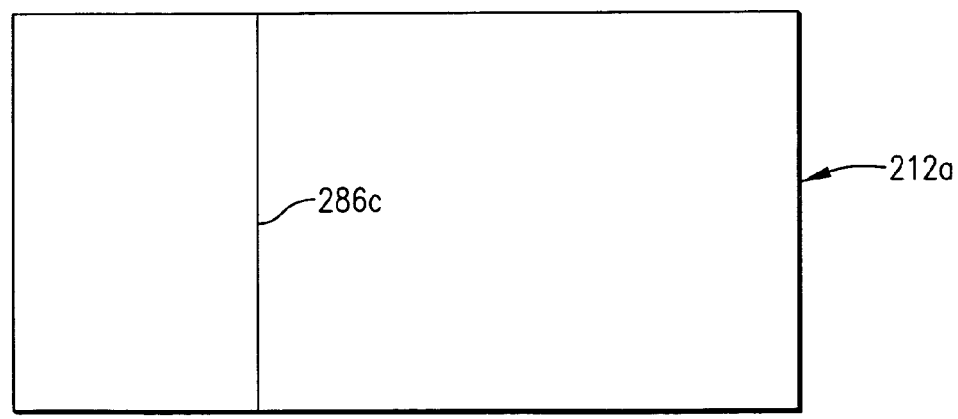

As shown in FIG. 27, the plate 212*a* may have a pair of registration lines 286*a* and 286*b* that are in alignment, in lieu of a single line 286 a shown in FIG. 26. Similarly, the registration line may be offset from the center of the plate as indicated by the line 286*c* in FIG. 28. The only requirement is that the registration line or marker on the plate 212*a* be located such that the plate 212*a* will be positioned in predetermined relationship to the center line of the cylindrical chase 250 when the plate 212*a* is attached to the chase 250.

In order to assure that plates 212 are all attached to cylindrical chase 250 in proper positions, one with respect to the other, the edges of plates 212 that are in adjacent relationship after assembly of the plates 212 on cylindrical chase 250, one adjacent edge of one of the plates 212 is provided with a projecting polarization tab 288 that is adapted to be received in a corresponding notch 290 in the opposed edge of a proximal plate 212, as shown in FIG. 17. It is to be understood in this respect that the tabs 288 and corresponding notches 290 are positioned in locations such that the plates 212 can be placed on cylindrical chase 250 in only one relative assembled orientation.

Figure 18:
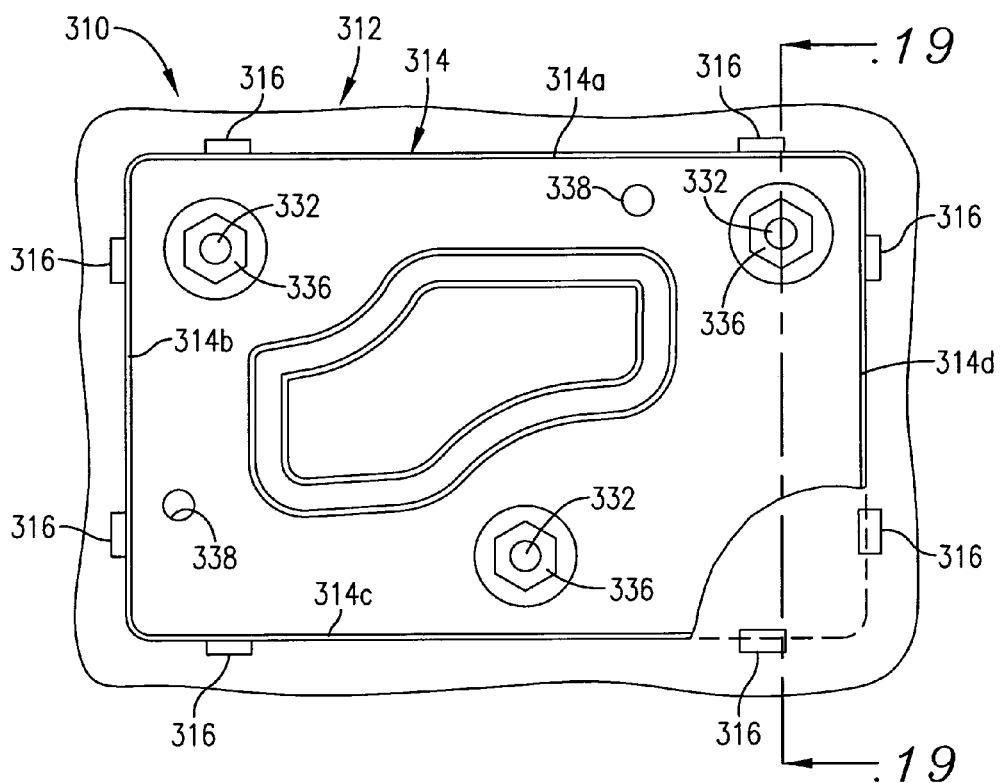
FIG. 18 is a fragmentary enlarged plan view of one of the support members illustrating the provision of slots in the support members designed to receive a suitable instrument for minutely adjusting the position of a die on the support member.
Figure 19:
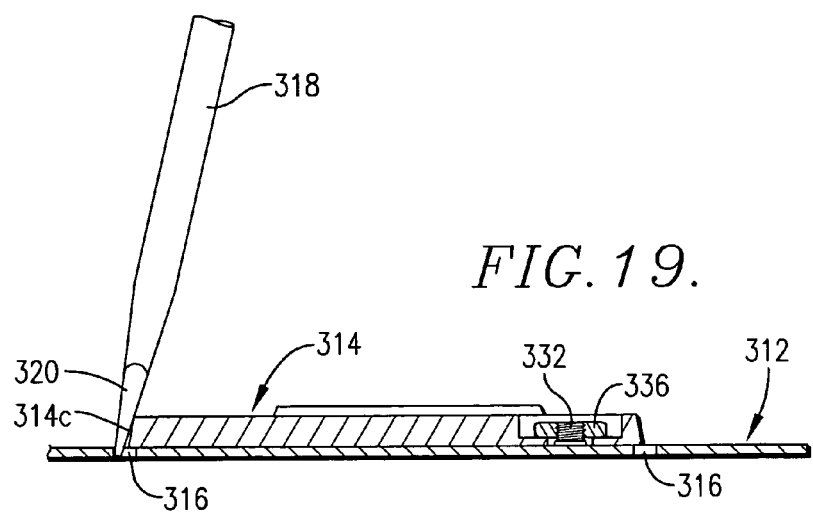
FIG. 19 is a fragmentary vertical cross-sectional view taken substantially along the line 19—19 of FIG. 18.

In the alternative die support assembly unit 310 illustrated in FIGS. 18 and 19, the die support plate members 312 are each provided with a plurality of rectangular cutouts 316 located in general surrounding relationship to each die 314 mounted on the outer surface of a respective support plate member 312. Viewing FIG. 18, it is to be seen that two cutouts 316 are provided in association with each of the edge portions 314*a*, 314*b*, 314*c*, and 314*d* of rectangular die 314. It is to be understood in this respect that each of the cutouts is located such that a portion of the cutout underlies a corresponding edge portion of the die 314. Thus, a tool in the nature of a conventional screwdriver 318 may be used to adjust the position of a die 314 with respect to the underlying die support plate member 312 by inserting the blade tip 320 of screwdriver 318 in one of the cutouts 316. Each die 314 is initially attached to the die support plate member 312 using nuts 336 threaded over studs 332, after pins have been inserted in the apertures 338 and extending into corresponding alignment openings, such as openings 40, in the underlying support plate member 312. In order to permit slight lateral adjustment of a die 314 as may be desired using the screwdriver tool 318 as shown in FIG. 19, the nuts 336 threaded over studs 332 projecting upwardly from the surface of die plate support member 312 are slightly loosened.

Figure 20:
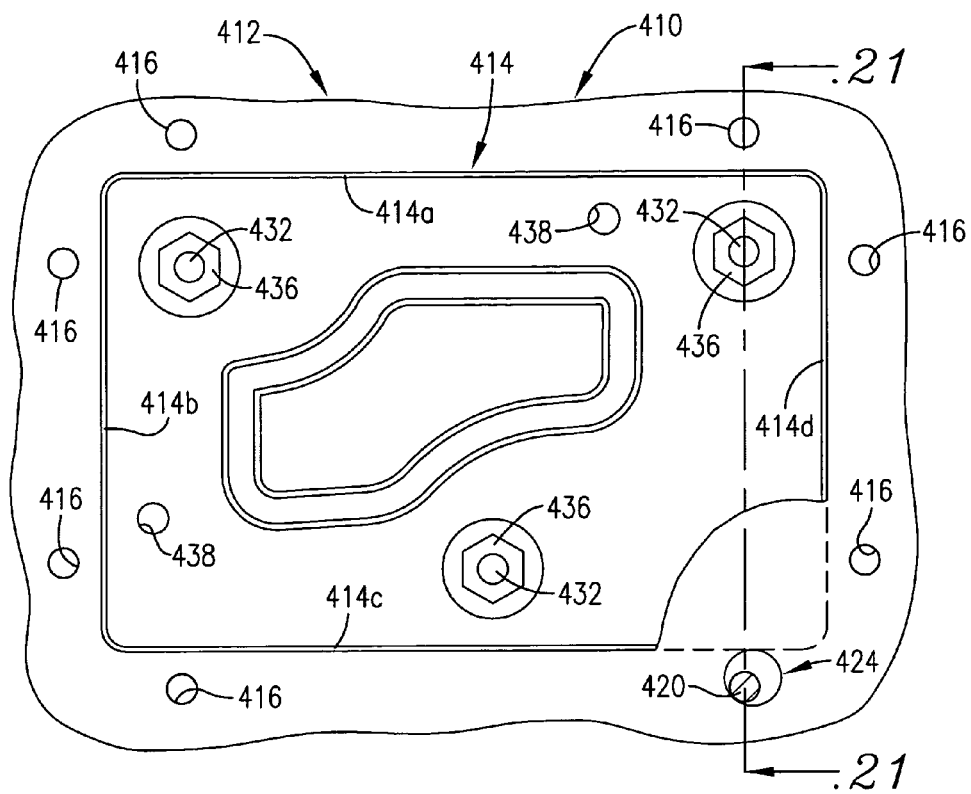
FIG. 20 is a fragmentary enlarged plan view of one of the support members similar to FIG. 18 but illustrating an alternate embodiment of structure for shifting a die to a minute degree using another form of tool than the tool shown in FIG. 19.
Figure 22:
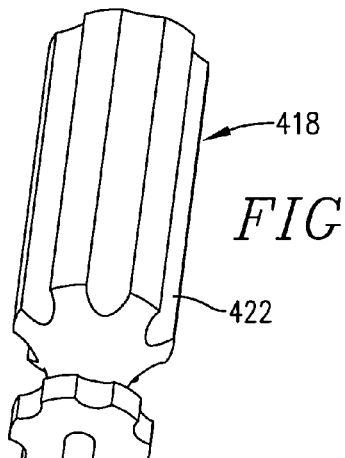
FIG. 22 is a perspective view of a tool useful for minutely adjusting the position of a die on a corresponding support member.
Figure 21:
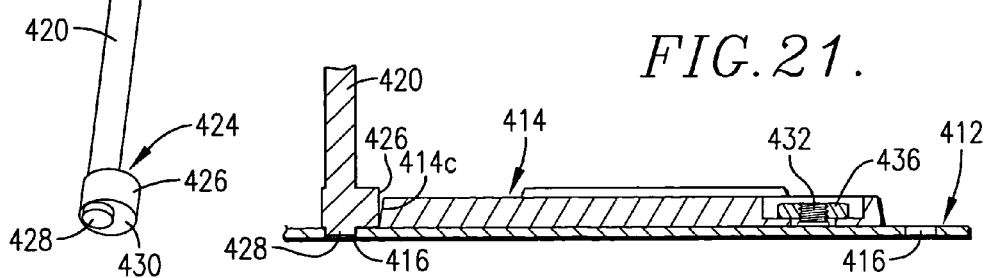
FIG. 21 is a fragmentary vertical cross-sectional view taken substantially along the line 21—21 of FIG. 20.

In a further alternative die and support assembly unit 410 shown in FIGS. 20 and 21, a plurality of circular cutouts 416 are provided in the die support plate member 412 in lieu of rectangular cutouts 316 in the die support plate 312. Two cutouts 416 are located outboard of the peripheral edge portions 414*a*, 414*b*, 414*c*, and 414*d* of rectangular die 414. It can be seen from FIG. 20 that each of the circular cutouts 416 is positioned in spaced relationship from a corresponding edge portion of die 414. A special tool 418 as depicted in FIG. 22 is provided for shifting die 414 laterally of a respective die support plate member 412. The tool 418 has a shaft 420 connected to a handle 422. The outer extremity of shaft 420 is provided with a cylindrical cam head 424 in which the axis of the head is offset from the axis of shaft 420 causing the cam surface 426 of head 424 to be eccentric with respect to the shaft axis. A cylindrical button 428 on the lowermost face 430 of head 424 is of the same diameter as each cutout 416, and is coaxial with shaft 420. The distance from the axis of button 428, and therefore the axis of shaft 420, to the outermost face of cam surface 426 is somewhat greater than the distance between the center of each cutout 416 and the adjacent peripheral edge portion 414a–d of die 414 when the die is mounted on support plate member 412 after having been affixed to plate member 412 through use of pins inserted into apertures 438 aligned with underlying apertures in the die support plate member 412.

When it is found necessary to slightly move a die 414 relative to the underlying die support plate member 412 in order to align the die surface with the image on the substrate, the nuts 436 are loosened slightly on respective studs 432, the button portion 428 of eccentric head 424 is inserted in a selected circular cutout 416, and the tool 418 rotated to bring the surface 426 of head 424 into engagement with a respective edge portion 414a–d of die 414. Continued rotation of tool 418 serves to slightly shift die 414.

Figure 24:
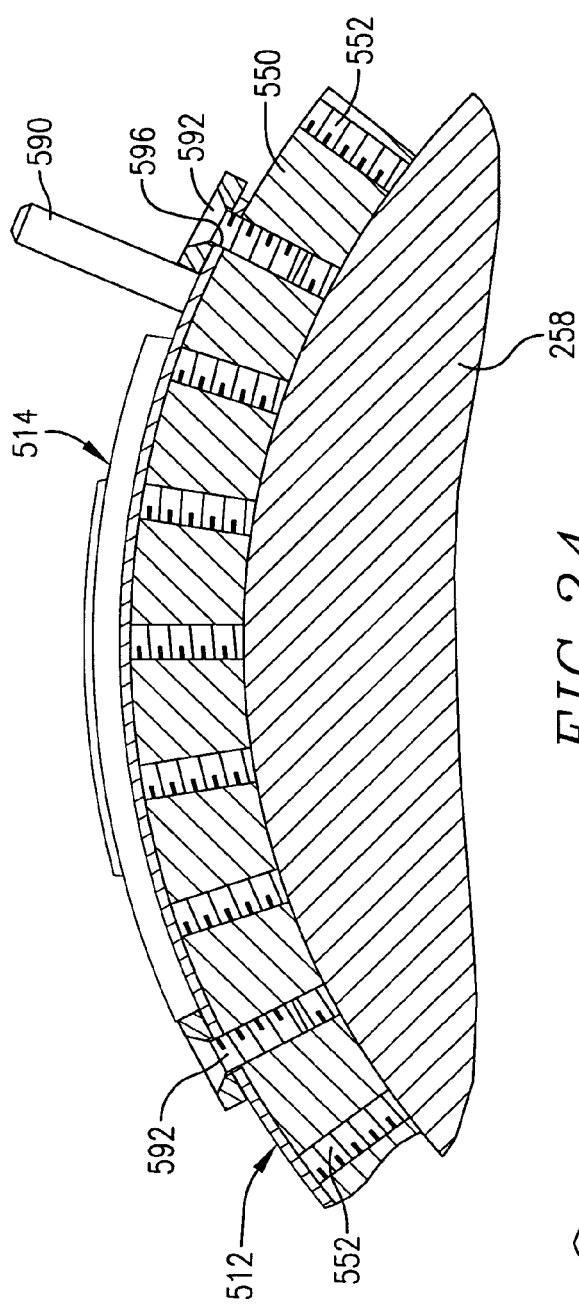
FIGS. 24 and 25 are enlarged vertical cross-sectional views taken substantially on the lines 24—24 and 25—25 respectively of FIG. 23.
Figure 25:
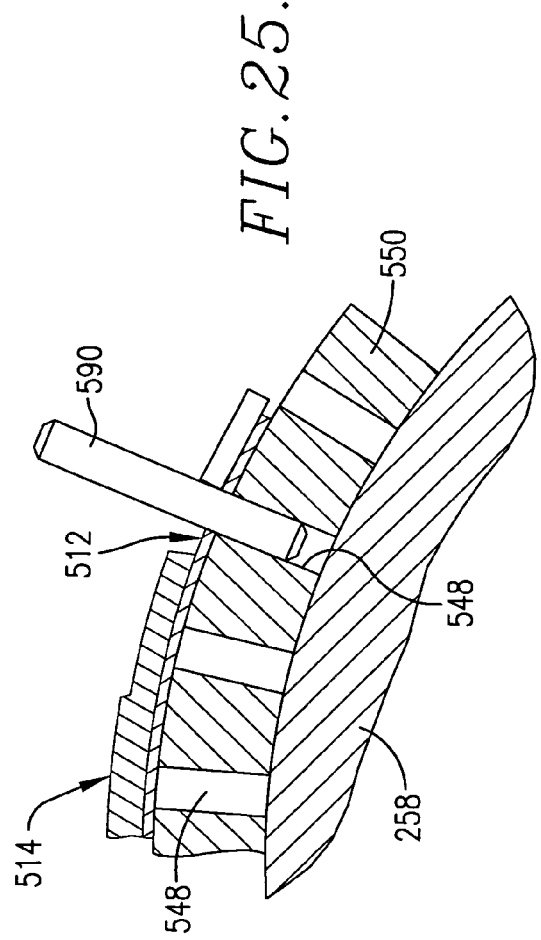

The alternative die plate support member and die assembly unit 510 depicted in FIGS. 23–25 has die plate support members 512 that are especially adapted for mounting on a cylindrical chase 550 that differs from chase 250 in that the chase 550 has alternate rows of smooth bore apertures 548 and threaded apertures 552. It can be seen from FIG. 23 that the apertures 552 are of smaller diameter than apertures 548 and are offset from the apertures 548. The apertures 548 and 552 of cylindrical chase 550 are arranged in a matrix X-Y grid pattern where there is a predetermined distance laterally and vertically between adjacent apertures. Information is entered into a computer program that is indicative of the X-Y coordinate positions and relative distances between adjacent apertures.

That program with information as to the positions and relative spacing of the apertures 548 and 552 is then used to program equipment for fabrication of the individual die support plate members 512. During that fabrication process, a series of elongated alignment openings 534 are formed along the edge portion of each of the die plates 512. Although only one alignment opening 534 in each die plate 512 is illustrated in FIG. 23, it is to be understood that a plurality of the elongated openings 534 are provided across the width of a respective die plate.

Each die plate 512 also has a plurality of die plate alignment apertures 538 (only one of which is illustrated in FIG. 23). The positions of the openings 534 and apertures 538 are established by the desired location of each die plate 512 based on the coordinates of the pattern of smooth bore apertures 548 in the cylindrical chase 550. The openings 534 and apertures 538 receive alignment pins 590 that are received in a corresponding underlying smooth bore aperture 548 in cylindrical chase 550. This die support plate alignment procedure is carried out with respect to all of the die support plates 512. In FIG. 23, the die support plate 512a that is intended to be in closest relationship to the gripper of the cylindrical chase 550 has the designation "GRIPPER" on the plate for orientation and identification purposes. It is to be recognized in this respect that there may be more than one support plate 512a across the width of the cylindrical chase 550 if desired.

During fabrication of each support plate 512, each plate is provided with alignment openings that are designed to align with apertures 553 in respective dies 514 so that pins inserted in apertures 553 and the underlying openings in a corresponding die support plate 512 provide for proper positioning of each die plate 514 on its corresponding support plate 512. After pin alignment of each die 514 on the support plate 512, nuts 536 are tightened on respective studs 532 secured to the plate 512 in order to affix each die to its support plate.

The support plates 512 may also be provided with rectangular cutouts 516 similar to cutouts 316 in plates 312, for minute adjustment of the dies 514 using a tool such as a screwdriver 318 as previously described with respect to unit 310.

Support plates 512 are preferably secured to the cylindrical chase 550 by screws 592 that extend through openings 596 therefor in support plate 512 and that thread into an underlying threaded aperture 552. The plates 512 may optionally be provided with elongated slots 594, which correspond to the slots 242 in plates 212, allowing plates 512 to be secured to a cylindrical chase 250 of the type illustrated in FIG. 11 using fasteners such as the toggle devices 244 received in the slots 594. When each plate 512 is mounted on a cylindrical chase such as chase 250, toggle devices 244 are also used to secure the edges of the plate 512 to the surface of the chase. Accordingly, plates 512 may be mounted on a conventional cylindrical chase of the type designated by 250, as well as a cylindrical chase such as 550 having alternate threaded and smooth bore mounting apertures. This is an advantage because one model of support plate may be provided for mounting on whatever type of press chase is in use.

An important advantage of the support plates 512 is the fact that by using a coordinate system for mounting the plates 512 on any one of two different types of apertured cylindrical chases of a rotary press, the computer program used to control fabrication of each support plate as well as the dies to be mounted on that plate, has all of the coordinate information necessary to assure that the alignment functions of the plate as well as the die are maintained for each production job, resulting in efficiency of fabrication and more accurate products.

The invention claimed is:

1. A graphic arts die assembly adapted to be mounted as a unit on the apertured chase of a flat bed press or the apertured cylindrical chase of a rotary graphic arts press, said assembly comprising:
a plurality of dies each having a stamping, embossing or die cut surface and an opposed mounting surface;
a die support member for the dies, said member having a die receiving surface and an opposed surface engageable with the chase of a flat bed press or the chase on the cylinder of a rotary press,
the plurality of graphic arts dies being mounted on said die receiving surface of the die support member in predetermined relative positions;
a plurality of upstanding die fasteners secured to the die receiving surface of the die support member, there being at least two fasteners for each die,
each of the dies having a through hole positioned to receive a respective fastener therein; and
a releasable connector on each fastener engaging a respective die for maintaining each die in a fixed position on the die support member,
said fasteners received in the through holes of a respective die being positioned in predetermined relationship with respect to and outboard of the design defining surface of that die.

2. An assembly as set forth in claim 1 wherein each of said holes is of a size greater than the thickness of the fastener received therein, sufficient to allow movement of each die relative to the fasteners for that die and with respect to the support member when the connectors of a respective die are released from fixed engagement with the die.

3. An assembly as set forth in claim 1 wherein the design defining surface of each die conforms to the design image of prepared artwork.

4. An assembly as set forth in claim 1 wherein the plurality of dies are mounted on the support member in disposition conforming the positions of a plurality of design image artwork.

5. A method of preparing a graphic arts die assembly adapted to be mounted as a unit on the apertured chase of a flat bed graphic arts press or the apertured cylindrical chase of a rotary graphic arts press, said method comprising the steps of:
   forming a stamping, embossing or die cutting operating surface in each of a plurality of dies, each of said operating surfaces conforming to design artwork;
   forming at least two through holes in each die located outboard of and in predetermined disposition relative to the operating surface of a respective die;
   providing a die support member for the dies in which the support member has a die receiving surface and an opposed mounting surface engageable with a flat bed chase or a rotary cylinder chase;
   attaching a plurality of fasteners to the die support member and each located relative to one another in disposition to be received in a respective through hole of a corresponding die;
   positioning the dies on the support plate with fasteners received in respective holes in a corresponding die; and
   applying a connector to each of the fasteners in disposition releasably engaging a respective die to fixedly secure each die to the support member; and
   forming at least one support member hold down slot in the die support member in disposition spaced from the perimeter edge of the support member.

6. A method as set forth in claim 5 wherein is included the step of successively affixing the fasteners to the die support surface of the support member.

7. A method as set forth in claim 5 wherein is included the steps of digitizing design artwork, forming an operating surface on each die in accordance with the digitized artwork, and locating the through holes in each die and positioning the fasteners on the support member to conform with the digitized artwork.

8. A method is set forth in claim 5 wherein is included the steps of forming through holes in each die larger than the width of respective fasteners, and temporarily releasing the connectors from fixed engagement with corresponding dies to an extent to permit shifting of a respective die with respect to the fasteners received in through holes through that die.

9. A method as set forth in claim 5 wherein is included the steps of forming the support member and each of the dies in complemental semi-cylindrical configuration for mounting on a rotary press apertured cylindrical chase of the press.

10. A method as set forth in claim 5 wherein is included the step of fixing each of the fasteners in a predetermined position, and moving the die support member through a displacement based on the location of the indicia, and securing each fastener to the die support member while fixed in said predetermined position.

11. Graphic arts die units adapted to be mounted as an assembly on the apertured chase of a flat bed press or apertured cylindrical chase of a rotary press, said assembly comprising:
   a plurality of dies each having a stamping, embossing or die cut surface and an opposed mounting surface;
   a plurality of die support plate members for the dies, said plate members having edge portions, a die receiving surface, and an opposed mounting surface engageable with the chase of a flat bed press or the chase on the cylinder of a rotary press,
   at least one die being mounted on each of the die support plate members in predetermined disposition with respect to the surface of a corresponding die support member,
   each of said die support plate members having an edge portion that is adjacent the edge portion of at least one other die support member when the graphic arts die units are assembled in predetermined relative dispositions on a flat bed press chase or the chase of a rotary press,
   said adjacent edge portions of the die support plate members each having notches therein, each of said notches being located in disposition to align to a corresponding notch in an opposed edge portion of an adjacent die support plate member,
   each pair of opposed notches cooperating to define an opening for removable reception of a combination alignment and spacing tool.

12. A graphic arts die unit assembly as set forth in claim 11, wherein said notches are of generally rectangular configuration.

13. A graphic arts die unit assembly as set forth in claim 11, wherein is provided at least a pair of notches in each of said adjacent edge portions of the die support plate member.

14. A graphic arts die unit assembly as set forth in claim 11, wherein is provided a polarization tab on one edge portion of a die support plate member adjacent the edge portion of another die support plate member, and the adjacent edge portion of said another die support plate member being provided with a notch located to receive the opposed tab, the tabs and corresponding notches receiving the tabs being located in different positions on different die support plate members.

15. A graphic arts die unit assembly as set forth in claim 11, wherein at least one of said die support plate members is provided with registration indicia thereon adapted to be aligned with a mark on the chase of a flat bed press or the cylindrical chase of a rotary press in order to permit registered orientation of the die support plate member with the mark on the chase of a flat bed press or the cylindrical chase of a rotary press.

16. A graphic arts die unit assembly as set forth in claim 11, wherein said die plate support members are provided with at least one cutout adjacent the peripheral edge portions of each die mounted on the die plate support member, each cutout being configured to receive the head of a tool in a position such that manual manipulation of the tool will selectively shift the die relative to the die support plate.

17. A graphic arts die unit assembly as set forth in claim 11, wherein each cutout is a rectangular opening underlying and projecting outwardly from a respective proximal peripheral edge portion of the die, each cutout being configured to receive the blade of a tool.

18. A graphic arts die unit assembly as set forth in claim 11, wherein each cutout is a circular opening adjacent and spaced from a respective proximal peripheral edge portion of the die, each cutout opening being located and configured to receive a cam tool for selective shifting of the proximal die in response to rotation of the cam tool.

19. A graphic arts die unit assembly as set forth in claim 11 adapted to be mounted on a rotary press cylindrical chase having alternate rows of smooth bore and threaded apertures, wherein each of said die support plate members is provided with apertures therein in disposition to be aligned with smooth bore apertures in the cylindrical chase for removable receipt of alignment pins, each of said die support plate members further being provided with openings therein that receive fasteners, which may be threaded into the threaded apertures in the cylindrical chase for releasably attaching the die support plate member to the cylindrical chase.

20. A graphic arts die unit assembly as set forth in claim 19, wherein said apertures and openings in each of the die support plate members are located in dispositions in accordance with an X-Y coordinate matrix that corresponds to the X-Y coordinate matrix of the apertures in the cylindrical chase on which the die support plate members are mounted.

21. A graphic arts die unit assembly as set forth in claim 19, wherein each of said die support plate members are provided with slots, and a series of fasteners, said slots being located to permit attachment of the die support plate members to a cylindrical chase in which all of the apertures in the chase are smooth bored, certain of said fasteners being adapted to extend through the slots into respective aligned chase apertures, and other of the fasteners engaging the periphery of each die support member and adapted to extend into aligned chase apertures.

22. A graphic arts die unit assembly as set forth in claim 11 wherein said support members and each of the dies are of planar configuration.

23. A graphic arts die unit assembly as set forth in claim 11 wherein said support members and each of the dies are of curved configuration, the curvature of the dies being complemental to the curvature of the support members.

24. A graphic arts die unit assembly as set forth in claim 23 wherein the assembly of curved support members extends through an arc of greater than 180°.

25. A graphic arts die unit assembly as set forth in claim 23 wherein the die support members are of the same arcuate length.

26. A graphic arts die unit assembly as set forth in claim 23 wherein the die support members are of different arcuate length.

27. A graphic arts die assembly adapted to be mounted as a unit on the apertured chase of a flat bed press or the apertured cylindrical chase of a rotary graphic arts press, said assembly comprising:
   a plurality of dies each having a design defining stamping, embossing or die cut surface and an opposed mounting surface;
   a die support member for the dies, said member having a die receiving surface and an opposed surface engageable with the chase of a flat bed press or the chase on the cylinder of a rotary press,
   the plurality of graphic arts dies being mounted on said die receiving surface of the die support member in predetermined relative positions;
   a plurality of upstanding threaded studs secured to the die receiving surface of the die support member, there being at least two studs for each die,
   each of the dies having a through hole positioned to receive a respective stud therein; and
   a releasable connector rotatively threaded onto a respective stud for maintaining each die in a fixed position on the die support member,
   each of said design defining surfaces of the dies being provided with a relief cavity aligned with a respective through hole in each die and sized to receive a connector threaded on to a corresponding stud.

28. An assembly as set forth in claim 27 wherein each of said connectors is a nut threaded onto a respective stud.

29. An assembly as set forth in claim 27 wherein each of said cavities is of a depth at least about equal to the thickness of a respective connector threaded onto a corresponding stud.

30. A graphic arts die assembly adapted to be mounted as a unit on the apertured chase of a flat bed press or the apertured cylindrical chase of a rotary graphic arts press, said assembly comprising:
   a plurality of dies each having a stamping, embossing or die cut surface and an opposed mounting surface;
   a die support member for the dies, said member having a die receiving surface and an opposed surface engageable with the chase of a flat bed press or the chase on the cylinder of a rotary press,
   the plurality of graphic arts dies being mounted on said die receiving surface of the die support member in predetermined relative positions;
   a plurality of upstanding die fasteners secured to the die receiving surface of the die support member, there being at least two fasteners for each die,
   each of the dies having a through hole positioned to receive a respective fastener therein; and
   a releasable connector on each fastener engaging a respective die for maintaining each die in a fixed position on the die support member,
   said support member having a perimeter edge and being provided with at least one support member hold down slot spaced from said edge of the support member for receiving a device engageable with the support member and the chase of a flat bed press or the chase of a rotary press on which the support member is mounted to hold the portion of the support member surrounding the hold down slot in substantial conforming contact with the adjacent area of a respective chase.

31. An assembly as set forth in claim 30 wherein is provided a plurality of spaced hold down slots in the support member for receiving respective devices and located such that the devices maintain the support member in close conforming relationship to the chase of a flat bed press or the cylindrical chase of a rotary press.

32. A graphic arts die assembly adapted to be mounted as a unit on the apertured chase of a flat bed press or the apertured cylindrical chase of a rotary graphic arts press, said assembly being configured to process a plurality of artwork design images in predetermined relative relationship with respect to one another, said assembly comprising:
   a plurality of dies each having a design-defining stamping, embossing or die cut surface conforming to a respective artwork design image, and an opposed mounting surface;
   a die support member for the dies, said support member having a die receiving surface and an opposed surface engageable with the chase of a flat bed press or the chase on the cylinder of a rotary press;
   a plurality of die fasteners secured to the die support member and extending away from the die receiving surface thereof,
   there being at least a pair of fasteners for each of said dies, and through holes in each die receiving respective fasteners,
   each of said pair of fasteners being located on the support member in a position that corresponds with and is established by the position of a particular artwork design image such that the dies mounted on the support member are in predetermined spaced relative positions with the stamping, embossing, or die cut surface of each die in precise register with its corresponding artwork design image; and
   a releasable connector on each fastener engaging a respective die for maintaining each die in its fixed position on a die support member.

33. An assembly as set forth in claim 32 wherein said support member has a plurality of recesses, with each recess receiving an end portion of a respective stud.

34. An assembly as set forth in claim 32 wherein each of the fasteners is an upstanding threaded stud affixed to the die receiving surface of the support member, said connectors being nuts threaded over respective studs.

35. An assembly as set forth in claim 34 wherein each of said studs is of generally cylindrical configuration and of greater height than width.

36. An assembly as set forth in claim 34 wherein the studs are located on the die receiving surface of the support member in predetermined relationship in accordance with a digitized program derived from and conforming to said artwork design images.

37. An assembly as set forth in claim 32 wherein said through holes in respective dies are sized relative to the fasteners received therein allowing movement of a respective die with respect to the support member through a displacement of at least about 0.050 in.

38. An assembly as set forth in claim 32 wherein said support member is from about 0.030 in. to about 0.100 in. thick.

39. An assembly as set forth in claim 32 wherein each of said dies is from about 0.150 in. to about 0.220 in. thick.

40. An assembly as set forth in claim 32 wherein the combined thickness of each die and the support member is about 0.250 in.

41. An assembly as set forth in claim 32 wherein the combined thickness of each die and the support member is about 7 mm.

42. An assembly as set forth in claim 32 wherein each of the said dies is from about 0.163 in. to about 0.233 in. thick.

43. An assembly as set forth in claim 32 wherein the combined thickness of each die and the support member is about 0.263 in.

44. An assembly as set forth in claim 32 wherein each of the dies has at least two apertures therein and the support member has an orifice therein aligned with each die aperture, the aligned apertures and orifices being in predetermined disposition relative to the design-defining stamping, embossing, or die cut surface of a respective die and adapted to receive an alignment tool extending therethrough.

45. An assembly as set forth in claim 32 wherein said support member and each of the dies are of planar configuration.

46. An assembly as set forth in claim 32 wherein said die receiving surface and said mounting surface of the support member are parallel throughout the die receiving surface area of the support member.

47. An assembly as set forth in claim 32 wherein said support member and each of the dies is of semi-cylindrical, conforming configuration.

48. A graphic arts die assembly as set forth in claim 32, wherein said die support member is of metallic material and the fasteners are each welded to the support member.

49. A graphic arts die assembly as set forth in claim 32, wherein said fasteners are located on the support member in disposition controlled by a program containing X-Y coordinate data that is representative of said relative positions of the plurality of artwork design images.

50. A graphic arts die assembly adapted to be mounted as a unit on the apertured chase of a flat bed press or the apertured cylindrical chase of a rotary graphic arts press configured to process a plurality of artwork designs in predetermined relationship with respect to one another, said assembly comprising:
a plurality of dies each having a design defining stamping, embossing or die cut surface conforming to a respective artwork design, and an opposed mounting surface, each of said dies having a plurality of alignment apertures;
a die support member for the dies, said member having a die receiving surface and an opposed surface engageable with the chase of a flat bed press or the chase on the cylinder of a rotary press,
said support member having an orifice aligned with each of the die apertures,
the plurality of graphic arts dies being on said die receiving surface of the die support member,
each of said dies having a plurality of alignment apertures,
said support member having an orifice aligned with each of the die apertures, each pair of aligned apertures and orifices being adapted to receive an alignment tool,
said apertures of each die and the orifices in the support member aligned therewith being located in relative dispositions such that the stamping, embossing, or die cut surface of each die as mounted on the support member corresponds to and will be in register with a respective artwork design;
a plurality of upstanding die fasteners secured to the die receiving surface of the die support member, there being at least two fasteners for each die,
said fasteners for each die being located in predetermined disposition relative to the die apertures and the support member orifices aligned with respective apertures,
each of the dies having a through hole positioned to receive a respective fastener therein; and
a releasable connector on each fastener engaging a respective die for maintaining each die in a fixed position on the die support member.

51. A graphic arts die assembly as set forth in claim 50, wherein said aligned apertures and orifices are configured to receive an alignment tool complemental therewith.

52. A method of preparing a graphic arts die assembly adapted to be mounted as a unit on the apertured chase of a flat bed graphic arts press or the apertured cylindrical chase of a rotary graphic arts press, said method comprising the steps of:
forming a stamping, embossing or die cutting operating surface in each of a plurality of dies, each of said operating surfaces conforming to design artwork;
forming at least two through holes in each die located outboard of and in predetermined disposition relative to the operating surface of a respective die;
providing a die support member for the dies in which the support member has a die receiving surface and an opposed mounting surface engageable with a flat bed chase or a rotary cylinder chase;
attaching a plurality of fasteners to the die support member and each located relative to one another in disposition to be received in a respective through hole of a corresponding die;
positioning the dies on the support plate with fasteners received in respective holes in a corresponding die;
applying a connector to each of the fasteners in disposition releasably engaging a respective die to fixedly secure each die to the support member;
forming at least one support member hold down slot in the die support member in disposition spaced from the perimeter edge of the support member; and
providing an indicia in the die support member, and locating the fasteners with respect to the location of the indicia using an X-Y coordinate matrix based on the indicia location.

* * * * *